United States Patent
Watanabe et al.

(10) Patent No.: US 7,501,185 B2
(45) Date of Patent: Mar. 10, 2009

(54) FILM-FORMING COMPOSITION, INSULATING MATERIAL-FORMING COMPOSITION, INSULATING FILM AND ELECTRONIC DEVICE

(75) Inventors: Katsuyuki Watanabe, Shizuoka (JP); Morio Yagihara, Saitama (JP); Kensuke Morita, Shizuoka (JP); Yutaka Adegawa, Shizuoka (JP); Akira Asano, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 477 days.

(21) Appl. No.: 11/149,385

(22) Filed: Jun. 10, 2005

(65) Prior Publication Data

US 2005/0276964 A1 Dec. 15, 2005

(30) Foreign Application Priority Data

| Jun. 10, 2004 | (JP) | ............................ P.2004-172689 |
| Sep. 27, 2004 | (JP) | ............................ P.2004-278957 |
| Sep. 27, 2004 | (JP) | ............................ P.2004-279581 |
| Sep. 27, 2004 | (JP) | ............................ P.2004-279668 |
| Feb. 28, 2005 | (JP) | ............................ P.2005-053124 |
| Jun. 6, 2005 | (JP) | ............................ P.2005-164943 |

(51) Int. Cl.
*B32B 27/30* (2006.01)
*C07C 13/28* (2006.01)

(52) U.S. Cl. ...................................... 428/500; 585/352

(58) Field of Classification Search .............. 428/411.1, 428/500; 106/285; 585/6.3, 352
See application file for complete search history.

(56) References Cited

U.S. PATENT DOCUMENTS

| 5,965,679 A | 10/1999 | Godschalx et al. |
| 6,380,347 B1 | 4/2002 | Lau et al. |
| 2002/0177743 A1 | 11/2002 | Dahl et al. |

FOREIGN PATENT DOCUMENTS

| JP | 2002-530505 A | 9/2002 |
| JP | 2002-534546 A | 10/2002 |
| JP | 2004-504455 A | 2/2004 |
| JP | 2004-523910 A | 8/2004 |
| WO | WO 02/057201 | 7/2002 |
| WO | WO 02/081546 A1 | 10/2002 |
| WO | WO 03/060979 A2 | 7/2003 |

OTHER PUBLICATIONS

Partial European Search Report dated Sep. 5, 2006.
Partial European Search Report dated Oct. 10, 2005.

*Primary Examiner*—Ramsey Zacharia
(74) *Attorney, Agent, or Firm*—Sughrue Mion, PLLC

(57) ABSTRACT

A film-forming composition comprising: a compound having a specific cage structure; a pore-forming agent; an adhesion promoter; and so on, an insulating film formed from the film-forming composition and an electronic device comprising the insulating film.

5 Claims, No Drawings

FILM-FORMING COMPOSITION, INSULATING MATERIAL-FORMING COMPOSITION, INSULATING FILM AND ELECTRONIC DEVICE

BACKGROUND OF THE INVENTION

1. Field of the Invention

The present invention relates to a film-forming composition, and more precisely to a composition for forming an insulating material such as an insulating film having good film properties in point of the dielectric constant and the mechanical strength thereof, to an insulating film formed from the composition, and to an electronic device having the insulating film.

2. Description of the Related Art

In recent years, accompanied by the progress of high integration, multifunction and high performance in the field of electronic materials, circuit resistance and condenser capacity between wirings have been increased thus causing increase of electric power consumption and delay time. Particularly, increase of delay time becomes a large factor for the reduction of signal speed of devices and generation of crosstalk, so that reduction of parasitic resistance and parasitic capacity are in demand for the purpose of attaining acceleration of devices by reducing this delay time. As one of the concrete measures for reducing this parasitic capacity, an attempt has been made to cover periphery of wiring with a low dielectric layer insulating film. Also, the layer insulating film is expected to have superior heat resistance which can withstand the thin film formation step at the time of mounting substrate production and chip connection, pin attachment and the like post steps and also chemical resistance that can withstand wet process. In addition, a low resistance Cu wiring has been introduced in recent years instead of the Al wiring, and accompanied by this, flattening by CMP (chemical mechanical polishing) is commonly carried out, so that high mechanical strength which can withstand this process is in demand.

Polybenzoxazole and polyimide are widely known for insulating films of good heat resistance. However, since they contain a nitrogen atom of low polarity, they could not form films that are satisfactory in point of the necessary low level of dielectric constant, the water absorption resistance, the durability and the hydrolysis resistance.

In general, many organic polymers are poorly soluble in organic solvent, and a technique of preventing polymer deposition in coating solutions and preventing depositions in insulating films is an important theme in the art. To solve the problems, when the polymers are so modified that their main chain has a folded structure in order to have an increased solubility, then their glass transition point lowers and their heat resistance also lowers, and, after all, it is not easy to obtain polymers that satisfy both the intended properties and the solubility.

For an insulating film, a highly heat-resistant resin having a backbone structure (main chain) of polyarylene ether (JP-T 2002-530505 (the term "JP-T" as used herein means a published Japanese translation of a PCT patent application), U.S. Pat. Nos. 6,380,347, 5,965,679 and JP-T 2002-534546) is related, but it is desired to further lower the dielectric constant of the resin for realizing high-speed devices. A method has been tried, which comprises making a film porous for lowering the dielectric constant of the resulting porous film. However, it is desired to lower the dielectric constant of the film while the porosity of the film is kept low in order to keep the film properties. It is also desired not to make a film porous but to make the film have a bulk specific dielectric constant of 2.6 or less, more preferably 2.5 or less.

JP-T 2004-504455 discloses a diamantane monomer substituted with an aryl group and a carbon-carbon triple bond. However, the film formed from the monomer could not have the desired specific dielectric constant of 2.5 or less, since the ratio of the benzene ring having a large electronic polarization in the compound is high.

In general, an organic polymer is poorly adhesive to silicon wafers, and is therefore often problematic in point of film peeling during wiring.

A related art, dual-damascene interconnection structure has essential problems that are as follows:

(a) Cu line thickness (trench depth) control and resistance control are unsatisfactory.
(b) The thermal expansion coefficient (CTE) of low-k dielectrics is high, and it causes final accidents during heat cycles.
(c) Ultra-low-k materials are not resistant to chemical mechanical polishing (CMP).

To solve these problems, a hybrid-type insulating film has been proposed (e.g., see JP-T 2004-523910). However, most organic polymers used in such hybrid-type insulating films are poorly soluble in organic solvent and are problematic in that they may deposit in coating solutions and may form depositions in insulating films. These problems are serious in the art. To solve the problems, when the polymers are so modified that their main chain has a folded structure in order to have an increased solubility, then their glass transition point lowers and their heat resistance also lowers, and, after all, it is not easy to obtain polymers that satisfy both the intended properties and the solubility.

SUMMARY OF THE INVENTION

The invention relates to a film-forming composition to solve the above-mentioned problems, especially to the composition suitable for an insulating film in electronic devices and capable of providing an insulating material having good properties in point of the dielectric constant, the mechanical strength and the adhesiveness thereof. The invention also relates to an insulating film formed from the composition, and to an electronic device having the insulating film.

The present inventors have found that the above-mentioned problems can be solved by the methods mentioned below.

(1) A film-forming composition comprising:
a compound having a cage structure; and
a pore-forming agent.

(2) The film-forming composition as described in (1) above,
wherein the cage structure of the compound is a saturated hydrocarbon structure.

(3) The film-forming composition as described in (1) or (2) above,
wherein a ratio of all carbon atoms of the cage structure to all carbon atoms of a total solid content of the film-forming composition is 30% or more.

(4) The film-forming composition as described in any of (1) to (3) above,
wherein the cage structure of the compound is an adamantane structure.

(5) The film-forming composition as described in any of (1) to (3) above,
wherein the cage structure of the compound is a diamantane structure.

(6) The film-forming composition as described in (5) above, wherein the compound having a cage structure is a polymer of at least one compound represented by formula (I):

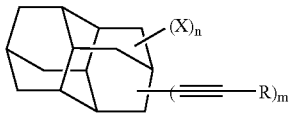

(I)

wherein R represents a hydrogen atom, an alkyl group, an alkenyl group, an alkynyl group, an aryl group or a silyl group;

m represents an integer of from 1 to 14;

X represents a halogen atom, an alkyl group, an alkenyl group, an aryl group or a silyl group; and n represents an integer of from 0 to 13.

(7) The film-forming composition as described in any of (1) to (6) above, wherein the compound having a cage structure does not have a nitrogen atom.

(8) The film-forming composition as described in any of (1) to (7) above, wherein the pore-forming agent is a polymer.

(9) The film-forming composition as described in any of (1) to (8) above, wherein the pore-forming agent is bound to the compound having a cage structure.

(10) The film-forming composition as described in any of (1) to (7) above, wherein the pore-forming agent is an organic solvent.

(11) The film-forming composition as described in any of (1) to (10) above, which further comprises anorganic solvent.

(12) An insulating film formed from a film-forming composition as described in any of (1) to (11) above.

(13) The insulating film as described in (12) above, which comprises pores, wherein a mean diameter of the pores is 5 nm or less.

(14) An electronic device comprising an insulating film as described in (12) or (13) above.

(15) A film-forming composition comprising:

a compound having a cage structure; and an organic solvent, wherein the cage structure comprises at least 11 carbon atoms and a ratio of all carbon atoms of the cage structure to all carbon atoms of a total solid content of the film-forming composition is 30% or more.

(16) The film-forming composition as described in (15) above, wherein the cage structure is a saturated aliphatic hydrocarbon structure.

(17) The film-forming composition as described in (15) or (16) above, wherein the cage structure is a di-valent to a tetra-valent.

(18) The film-forming composition as described in any of (15) to (17) above, wherein the cage structure is a diamantane structure.

(19) The film-forming composition as described in any of (15) to (18) above, wherein the cage structure is a part of a main chain of a polymer.

(20) The film-forming composition as described in (19) above, wherein the compound having a cage structure is a polymer of at least one compound represented by formula (I):

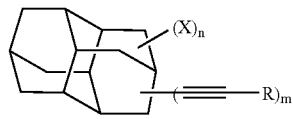

(I)

wherein R represents a hydrogen atom, an alkyl group having from 1 to 10 carbon atoms, an alkenyl group having from 2 to 10 carbon atoms, an alkynyl group having from 2 to 10 carbon atoms, an aryl group having from 6 to 20 carbon atoms or a silyl group having from 0 to 20 carbon atoms;

m represents an integer of from 1 to 14;

X represents a halogen atom, an alkyl group having from 1 to 10 carbon atoms, an alkenyl group having from 2 to 10 carbon atoms, an aryl group having from 6 to 20 carbon atoms or a silyl group having from 0 to 20 carbon atoms; and n represents an integer of from 0 to 13.

(21) The film-forming composition as described in (20) above, wherein, in formula (I), R is a hydrogen atom or an alkyl group having from 1 to 10 carbon atoms, m=1 to 3 and n=0.

(22) The film-forming composition as described in any of (15) to (21) above, wherein the compound having a cage structure does not have a nitrogen atom.

(23) An insulating film formed from a film-forming composition as described in any of (15) to (22) above

(24) An electronic device comprising an insulating film formed from a film-forming composition as described in any of (15) to (22) above.

(25) An insulating material-forming composition comprising:

a compound having a cage structure; and an adhesion promoter.

(26) The insulating material-forming composition as described in (25) above, wherein the cage structure is a saturated hydrocarbon structure.

(27) The insulating material-forming composition as described in (25) or (26) above, wherein a ratio of all carbon atoms of the cage structure to all carbon atoms of a total solid content that constitutes an insulating material in the insulating material-forming composition is 30% or more.

(28) The insulating material-forming composition as described in any of (25) to (27) above, wherein the cage structure is an adamantane structure.

(29) The insulating material-forming composition as described in any of (25) to (27) above, wherein the cage structure is a diamantane structure.

(30) The insulating material-forming composition as described in any of (25) to (27) above, wherein the compound having a cage structure is a polymer of at least one compound represented by formula (I):

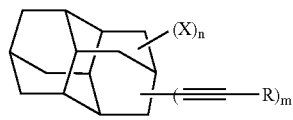

(I)

wherein R represents a hydrogen atom, an alkyl group, an alkenyl group, an alkynyl group, an aryl group or a silyl group;

m represents an integer of from 1 to 14;

X represents a halogen atom, an alkyl group, an alkenyl group, an aryl group or a silyl group; and n represents an integer of from 0 to 13.

(31) The insulating material-forming composition as described in any of (25) to (30) above, wherein the compound having a cage structure does not have a nitrogen atom.

(32) The insulating material-forming composition as described in any of (25) to (31) above, wherein the adhesion promoter is a silane compound.

(33) The insulating material-forming composition as described in any of (25) to (32) above, which further comprises an organic solvent.

(34) An electronic device comprising an insulating film formed from an insulating material-forming composition as described in any of (25) to (33) above.

(35) An insulating material comprising:

a polymer formed from an insulating material-forming composition comprising a compound having a cage structure; and an adhesion promoter.

(36) The insulating material as described in (35) above, wherein the cage structure is a saturated hydrocarbon structure.

(37) The insulating material as described in (35) or (36) above, wherein a ratio of all carbon atoms of the cage structure to all carbon atoms of a total solid content that constitutes the insulating material is 30% or more.

(38) The insulating material as described in any of (35) to (37) above, wherein the cage structure is an adamantane structure.

(39) The insulating material as described in any of (35) to (37) above, wherein the cage structure is a diamantane structure.

(40) The insulating material as described in (39) above, wherein the compound having a cage structure is a polymer of at least one compound represented by formula (I):

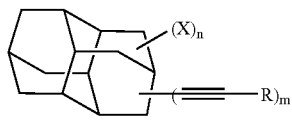

wherein R represents a hydrogen atom, an alkyl group, an alkenyl group, an alkynyl group, an aryl group or a silyl group;

m represents an integer of from 1 to 14;

X represents a halogen atom, an alkyl group, an alkenyl group, an aryl group or a silyl group; and n represents an integer of from 0 to 13.

(41) The insulating material as described in any of (35) to (40) above, wherein the compound having a cage structure does not have a nitrogen atom.

(42) The insulating material as described in any of (35) to (41) above, wherein the adhesion promoter is a silane compound.

(43) An electronic device comprising an insulating material as described in any of (35) to (42) above.

(44) A hybrid insulating film comprising:

a lower insulating film; and an upper insulating film, and the lower insulating film and the upper insulating film have different elementary compositions, wherein one of the lower insulating film and the upper insulating film is formed from a film-forming composition that comprises a compound having a cage structure.

(45) The hybrid insulating film as described in (44) above, wherein the other of the lower insulating film and the upper insulating film comprises a silicon atom.

(46) The hybrid insulating film as described in (44) or (45) above, wherein the cage structure is a saturated hydrocarbon structure.

(47) The hybrid insulating film as described in any of (44) to (46) above, wherein a ratio of all carbon atoms of the cage structure to all carbon atoms of a total solid content of the film-forming composition is 30% or more.

(48) The hybrid insulating film as described in any of (44) to (47) above, wherein the cage structure is an adamantane structure.

(49) The hybrid insulating film as described in any of (44) to (47) above, wherein the cage structure is a diamantane structure.

(50) The hybrid insulating film as described in (49) above, wherein the compound having a cage structure is a polymer of at least one compound represented by formula (I):

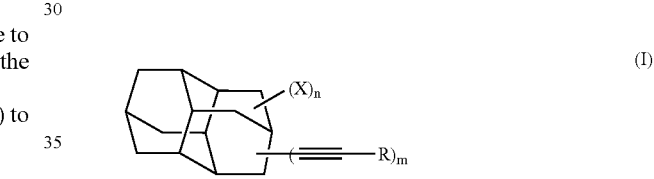

wherein R represents a hydrogen atom, an alkyl group, an alkenyl group, an alkynyl group, an aryl group or a silyl group;

m represents an integer of from 1 to 14;

X represents a halogen atom, an alkyl group, an alkenyl group, an aryl group or a silyl group; and n represents an integer of from 0 to 13.

(51) The hybrid insulating film as described in any of (44) to (50) above, wherein the compound having a cage structure does not have a nitrogen atom.

(52) The hybrid insulating film as described in any of (45) to (51) above, wherein the insulating film comprising a silicon atom further comprises an oxygen atom, a hydrogen atom and a carbon atom.

(53) An electronic device comprising a hybrid insulating film as described in any of (44) to (52) above.

DETAILED DESCRIPTION OF THE INVENTION

The invention is described in detail hereinunder.

Film-Forming Composition

The present inventors have found that a film-forming composition which contains a compound having a cage structure and a pore-forming agent, and also a film-forming composition which contains a compound having a cage structure and an organic solvent and in which the cage structure of the compound having a cage structure is formed of at least 11 or more carbon atoms and the ratio of all carbon atoms of the cage structure to all carbon atoms of the total solid content of the composition is 30% or more can provide an insulating material suitable to insulating films having good mechanical strength and a low dielectric constant.

For lowering the specific dielectric constant of an insulating film, it is effective that the polymer skeleton to constitute the insulating film is formed of saturated hydrocarbons having a small electronic polarization. However, since saturated hydrocarbons generally have poor heat resistance, highly heat-resistant diamond-type hydrocarbons are effective for the molecular plan to satisfy both reduced dielectric constant and increased heat resistance. The diamond-type hydrocarbons are preferably diamantanes and triamantanes having a large molecular weight from the viewpoint of reducing the density of films based on the three-dimensional bulkiness thereof.

Compound having Cage Structure

The composition of the invention for forming films such as insulating films and for forming other insulating materials (film-forming or insulating material-forming composition) contains a compound having a cage structure.

The compound having a cage structure may be a low-molecular compound or a high-molecular compound (e.g., polymer) so far as it has a cage structure.

The "cage structure" as referred to herein is meant to indicate a molecule in which the plural rings formed of covalent-bonded atoms define the capacity of the structure and in which all points existing inside the capacity could not leave the capacity without passing through the rings. For example, an adamantane structure may be considered as the cage structure. Contrary to this, a single crosslink-having cyclic structure such as norbornane (bicyclo[2,2,1]heptane) could not be considered as the cage structure since the ring of the single-crosslinked cyclic compound does not define the capacity of the compound.

The number of all carbon atoms of the cage structure in the invention is preferably from 10 to 30, more preferably from 10 to 18, even more preferably from 10 to 14.

The carbon atoms that constitute the cage structure do not include the carbon atoms of the linking group and the substituent bonding to the cage structure. For example, 1-methyladamantane is composed of 10 carbon atoms, and 1-ethyldiamantane is composed of 14 carbon atoms.

Preferably, the cage structure in the invention is a saturated hydrocarbon. Preferred examples of the cage structure are diamond-like adamantanes, diamantanes, triamantanes, tetramantanes and dodecahedranes as having good heat resistance. Of those, diamantanes, triamantanes and tetramantanes are preferred as having a lower dielectric constant; and adamantanes and diamantanes are preferred as easy to produce. In view of these, adamantanes and diamantanes are more preferred; and diamantanes are the most preferred.

A pore-forming agent may not be in the film-forming composition. In such a case, the film-forming composition contains a compound having a cage structure and an organic solvent, in which the cage structure of the structure-having compound is formed of at least 11 or more carbon atoms and the ratio of all carbon atoms of the cage structure to all carbon atoms of the total solid content of the composition is 30% or more. The film-forming composition of the type also provides an insulating material having good mechanical strength and a low dielectric constant.

In this case, the cage structure is preferably formed of from 11 to 30 carbon atoms, more preferably from 12 to 20 carbon atoms, even more preferably from 12 to 14 carbon atoms.

Since the cage structure is formed of at least 11 or more carbon atoms, the composition may have good dielectric properties. Preferably, the compound having a cage structure for use in the invention is a saturated aliphatic hydrocarbon, including, for example, diamantanes, triamantanes, tetramantanes and dodecahedranes. Of those, especially preferred are diamantanes from the viewpoint of reduced dielectric constant, good solubility in coating solvent and prevention of depositions in insulating films.

The cage structure according to the invention may have one or more substituent groups, and examples of the substituent groups include a halogen atom (fluorine atom, chlorine atom, bromine atom or iodine atom), a straight, branched or cyclic alkyl group having from 1 to 10 carbon atoms (methyl, t-butyl, cyclopentyl, cyclohexyl or the like), an alkenyl group having from 2 to 10 carbon atoms (vinyl, propenyl or the like), an alkynyl group having from 2 to 10 carbon atoms (ethynyl, phenylethynyl or the like), an aryl group having from 6 to 20 carbon atoms (phenyl, 1-naphthyl, 2-naphthyl or the like), an acyl group having from 2 to 10 carbon atoms (benzoyl or the like), an aryloxy group having from 6 to 20 carbon atoms (phenoxy or the like), an arylsulfonyl group having from 6 to 20 carbon atoms (phenylsulfonyl or the like), nitro group, cyano group, a silyl group (triethoxysilyl, methyldiethoxysilyl, trivinylsilyl or the like) and the like. Further preferred substituent groups are fluorine atom, bromine atom, a straight, branched or cyclic alkyl group having from 1 to 5 carbon atoms, an alkenyl group having from 2 to 5 carbon atoms, an alkynyl group having from 2 to 5 carbon atoms and a silyl group. These substituent groups may be further substituted with other substituent groups.

Preferably, the cage structure is mono- to tetra-valent, more preferably di- or tri-valent, even more preferably divalent. The group bonding to the cage structure may be a mono- or more poly-valent substituent or a di- or more poly-valent linking group. The "valence" as referred to herein is meant to indicate the number of chemical bonds.

The "compound having a cage structure" of the invention may be either a low molecular weight compound or a high molecular weight compound (e.g., a polymer), but preferred is a polymer. When the compound having a cage structure is a polymer, its weight average molecular weight is preferably from 1,000 to 500,000, more preferably from 5,000 to 300,000, particularly preferably from 10,000 to 200,000. The polymer having a cage structure may be a resin having a molecular weight distribution. When the compound having a cage structure is a low molecular weight compound, its molecular weight is preferably from 150 to 3,000, more preferably from 200 to 2,000, particularly preferably from 220 to 1,000.

The cage structure according to the invention may be incorporated into a polymer principal chain as a monovalent pendant group. As a desirable polymer principal chain to which a cage structure is bonded, poly(allylene), poly(allylene ether), poly(ether), polyacetylene, polyethylene and the like can be exemplified, of which poly(allylene ether) and polyacetylene are particularly desirable with respect to a good heat resistance.

It is particularly desirable that the cage structure of the invention forms a part of a polymer principal chain when the compound having a cage structure is a polymer. That is, when it forms a part of a polymer principal chain, it means that polymer chain is cut off when the cage structure is removed from this polymer. In this embodiment, the cage structure is directly single-bonded or connected by an appropriate divalent connecting group. Examples of the connecting group include —C($R_{11}$)($R_{12}$)—, —C($R_{13}$)=C($R_{14}$)—, —C≡C—, allylene group, —CO—, —O—, —SO$_2$—, —N(R$_{15}$)—, —Si (R$_{16}$)(R$_{17}$)— and a group as a combination thereof. In this case, R$_{11}$ to R$_{17}$ each independently represents hydrogen atom, an alkyl group, an alkenyl group, an alkynyl group, an aryl group or an alkoxy group. These connecting groups may be substituted with a substituting group, and for example, the aforementioned substituting groups can be cited as preferred examples.

More preferred connecting groups among them is —C(R$_{11}$)(R$_{12}$)—, —CH═CH—, —C≡C—, allylene group, —O—, —Si (R$_{16}$)(R$_{17}$)— or a group as a combination thereof, and particularly preferred is —CH═CH—, —C≡C—, —O—, —Si (R$_{16}$)(R$_{17}$)— or a group as a combination thereof.

The "compound having a cage structure" of the invention may contain one or two or more species of the cage structures in the molecule of the compound.

Especially preferably, the compound having a cage structure is curable under heat.

With respect to a thermosetting property, the compound having a cage structure preferably has a reactive group capable of forming a covalent bond with any other molecule under heat. The reactive group is not specifically defined, for which, for example, preferred is a substituent that leads cyclization-addition reaction or radical polymerization reaction. For example, a double bond-having group (e.g., vinyl group, allyl group), a triple bond-having compound (e.g., ethynyl group, phenylethynyl group), and a combination of a diene group and a dienophile group to lead Diels-Alder reaction are effective. In particular, an ethynyl group and a phenylethynyl group are effective.

For example, a polymer of a compound of formula (I) mentioned below as one typical example of the compound having a cage structure cures, when applied onto a support and heated thereon, through post-heat polymerization at the remaining ethynyl group, and becomes insoluble in organic solvent.

Preferably, the compound having a cage structure for use in the invention does not contain a nitrogen atom since the atom increases the molar polarizability of the compound and causes moisture absorption of insulating material and since it increases the dielectric constant of the composition. In particular, polyimide compounds could not act to sufficiently lower the dielectric constant of the composition. Therefore the compound having a cage structure for use in the invention is a compound except polyimide, or that is, a compound not having an imido bond.

Specific examples of the compound having a cage structure are mentioned below, to which, however, the invention is not limited. n represents a positive number.

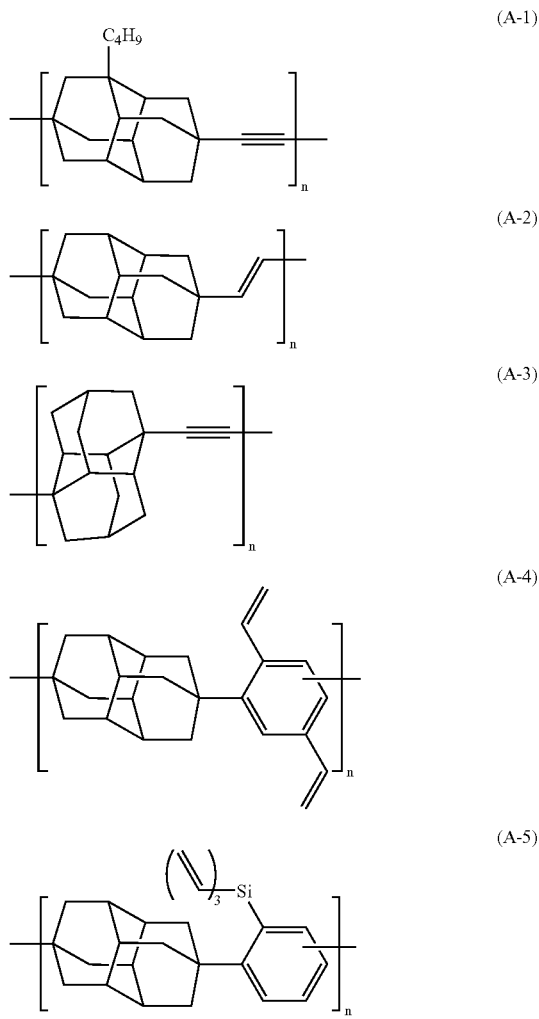

-continued
(A-6)
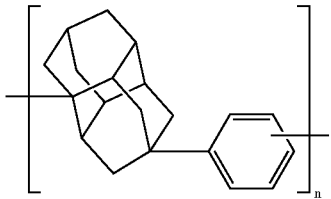
(A-7)
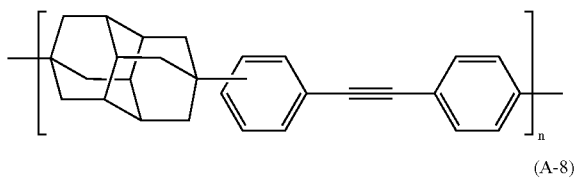
(A-8)
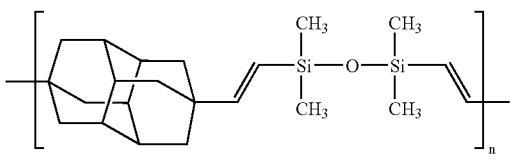
(A-9)
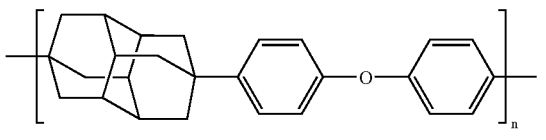
(A-10)
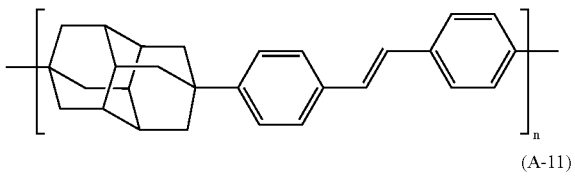
(A-11)
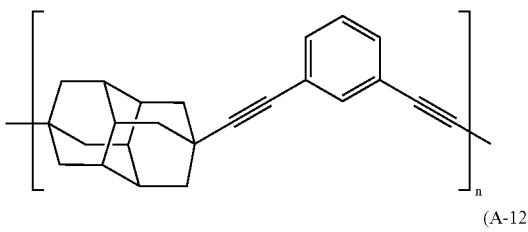
(A-12)
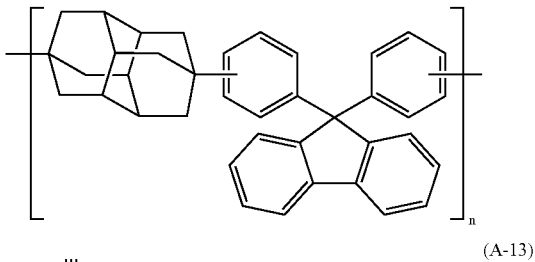
(A-13)
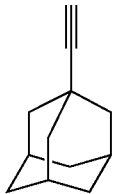

-continued
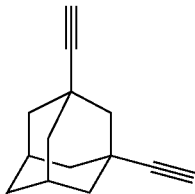 (A-14)
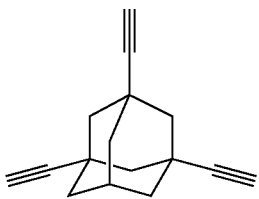
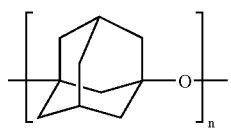 (A-15)
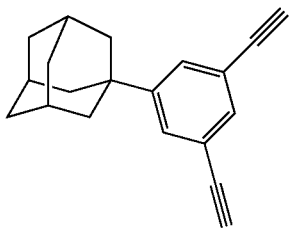
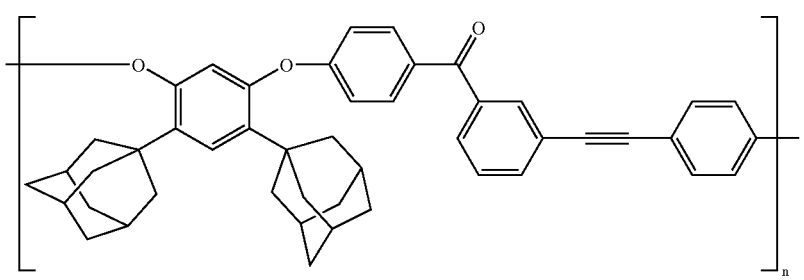 (A-16)
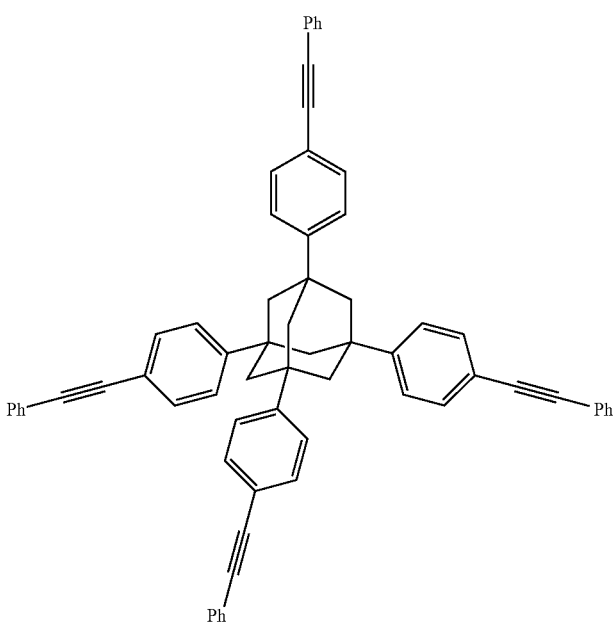 (A-17)

-continued
(A-19)
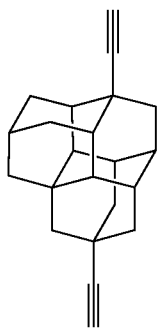
(A-20)
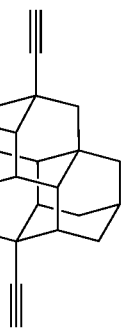
(A-21)
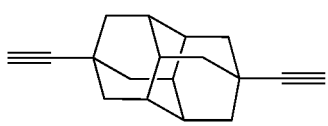
(A-22)
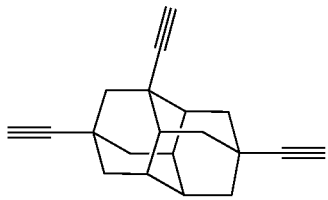
(A-23)
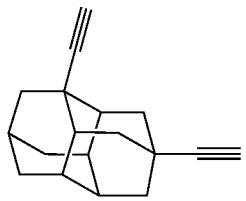
(A-24)
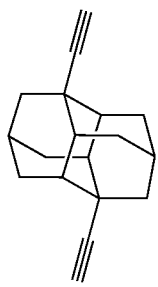
(A-25)
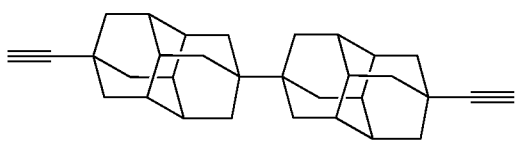
(A-26)
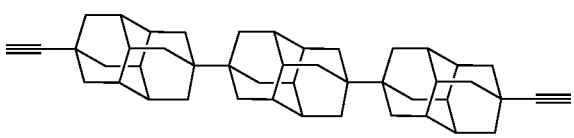

The case structure-having compound may be produced in any known method, for which, however, commercially-available ones may also be used.

Compound of Formula (I)

Especially preferably, the compound having a cage structure is a polymer of a compound of the following formula (I):

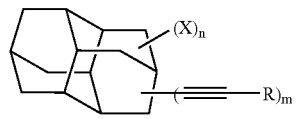
(I)

in the formula (I),

R represents hydrogen atom, an alkyl group preferably having from 1 to 10 carbon atoms, an alkenyl group preferably having from 2 to 10 carbon atoms, an alkynyl group preferably having from 2 to 10 carbon atoms, an aryl group preferably having from 6 to 20 carbon atoms, or a silyl group preferably having from 0 to 20 carbon atoms.

When R is other than hydrogen atom, each group as R may has a substituent group. Examples of the substituent group include a halogen atom (fluorine atom, chlorine atom, bromine atom or iodine atom), an alkyl group, an alkenyl group, an alkynyl group, an aryl group, an acyl group, an aryloxy group, an arylsulfonyl group, nitro group, cyano group, a silyl group and the like. R is preferably a hydrogen atom, an alkyl group having from 1 to 10 carbon atoms, an aryl group having from 6 to 20 carbon atoms or a silyl group having from 0 to 20 carbon atoms, preferably a hydrogen atom or a silyl group having from 0 to 10 carbon atoms.

The sign m is an integer of from 1 to 14, preferably an integer of from 1 to 4, more preferably an integer of from 1 to 3, and particularly preferably 2 or 3.

X represents a halogen atom, an alkyl group preferably having from 1 to 10 carbon atoms, an alkenyl group preferably having from 2 to 10 carbon atoms, an aryl group preferably having from 6 to 20 carbon atoms, or a silyl preferably having from 0 to 20 carbon atoms.

Each group as X may has a substituent group wherein the aforementioned substituent groups that each group as R may has can be cited as examples of the substituent group. X is preferably fluorine atom, chlorine atom, bromine atom, an alkyl group having from 1 to 10 carbon atoms, an alkenyl group having from 2 to 10 carbon atoms or a silyl group having from 0 to 20 carbon atoms, preferably bromine atom, an alkenyl group having from 2 to 4 carbon atoms or a silyl group having from 0 to 10 carbon atoms.

n represents an integer of from 0 to 13, preferably an integer of from 0 to 3, more preferably an integer of from 0 to 2, even more preferably 0 or 1.

Preferred for use herein are compounds of formula (I) where R is a hydrogen atom or an alkyl group having from 1 to 10 carbon atoms, m=1 to 3, and n=0.

For the compounds of formula (I), also usable are those prepared by bonding plural compounds of formula (I) with a single bond or a linking group.

Specific examples of the compounds of formula (I) are mentioned below, to which, however, the invention is not limited.

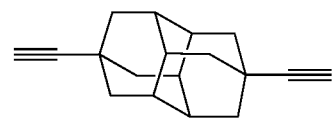
(D-1)

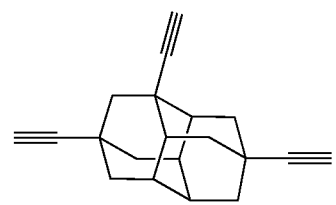
(D-2)

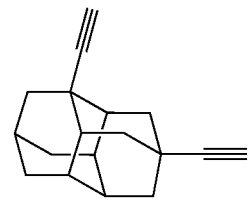
(D-3)

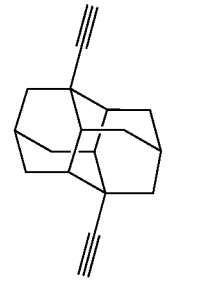
(D-4)

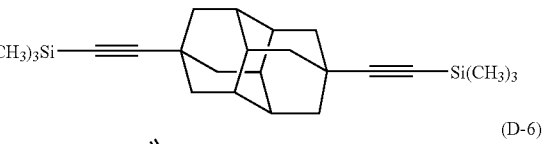
(D-5)

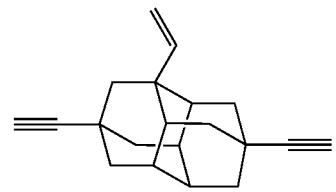
(D-6)

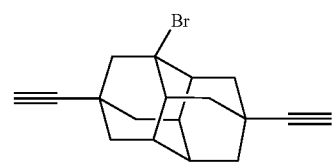
(D-7)

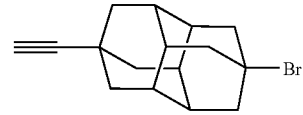
(D-8)

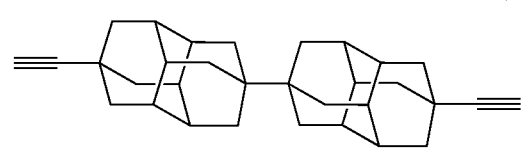
(D-9)

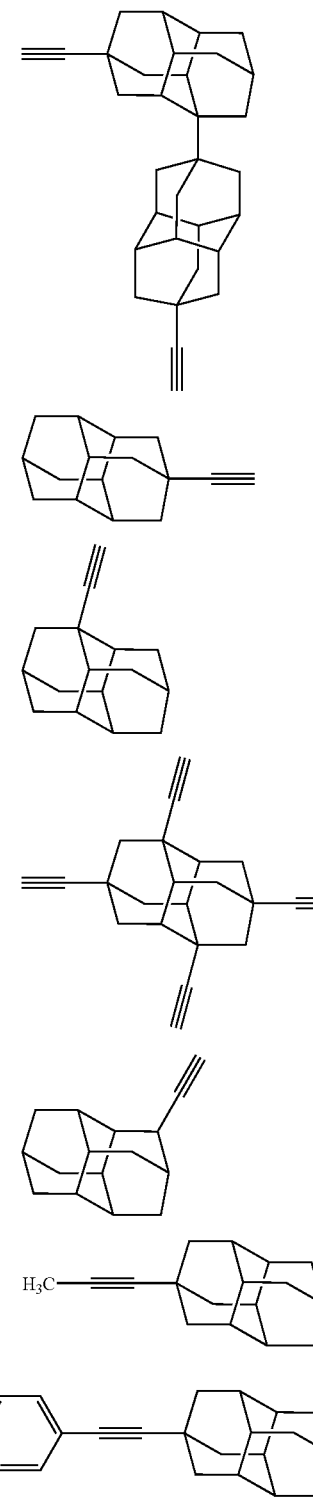

The compound of formula (I) of the invention is more preferably 1-ethynyldiamantane, 4-ethynyldiamantane, 4,9-diethynyldiamantane, 1,6-diethynyldiamantane, 1,4-diethynyldiamantane or 1,4,9-triethynyldiamantane, and particularly preferably 4,9-diethynyldiamantane or 1,6-diethynyldiamantane.

The compounds of formula (I) may be produced, starting from commercially-available diamantanes. Briefly, a diamantane is reacted with bromine in the presence or absence of an aluminium bromide catalyst to thereby introduce the bromine atom into a desired site of the compound, then this is reacted with vinyl bromide in the presence of a Lewis acid such as aluminium bromide, aluminium chloride or iron chloride in a mode of Friedel-Crafts reaction to thereby introduce a 2,2-dibromoethyl group into it, and this is processed with a strong base for HBr removal so as to convert the 2,2-dibromoethyl group into an ethynyl group. Concretely, the compounds may be produced according to the methods described in *Macromolecules,* 1991, Vol. 24, pp. 5266-5268; *Macromolecules,* 1995, Vol. 28, pp. 5554-5560; *Journal of Organic Chemistry,* 39, 2995-3003 (1974).

The hydrogen atom of the terminal acetylene group in the compound may be anionized with butyllithium or the like, and this may be reacted with an alkyl halide or a silyl halide to thereby introduce an alkyl group or a silyl group into the compound.

Preparation of Polymer of Compound of Formula (I)

Preferably, the compound of formula (I) is polymerized into its polymer in an organic solvent. We, the present inventors have found that the polymer obtained through polymerization of the compound in an organic solvent is much more effective than that obtained through polymerization of the compound in the absence of a solvent in point of the solubility of the polymer in organic solvent.

For the polymer thereof, one or more compounds of formula (I) may be polymerized either singly or as combined. Further, they may be copolymerized with any other compound having a carbon-carbon triple bond except the compounds of formula (I).

The organic solvent for the polymerization may be any one capable of dissolving the starting monomer and not having any negative influence on the properties of the films to be formed of the resulting polymer. For example, it includes ketone solvents such as acetone, methyl ethyl ketone, methyl isobutyl ketone, cyclohexanone, acetophenone; ester solvents such as ethyl acetate, butyl acetate, propylene glycol monomethyl ether acetate, γ-butyrolactone, methyl benzoate; ether solvents such as dibutyl ether, anisole; aromatic hydrocarbon solvents such as toluene, xylene, mesitylene, 1,3,5-triisopropylbenzene; amide solvents such as N-methylpyrrolidinone, dimethylacetamide; halogen containing solvents such as carbon tetrachloride, dichloromethane, chloroform, 1,2-dichloroethane, chlorobenzene, 1,2-dichlorobenzene, 1,2,4-trichlorobenzene; aliphatic hydrocarbon solvents such as hexane, heptane, octane, cyclohexane. Of those, more preferred are acetone, methyl ethyl ketone, methyl isobutyl ketone, cyclohexanone, acetophenone, ethyl acetate, propylene glycol monomethyl ether acetate, γ-butyrolactone, anisole, tetrahydrofuran, toluene, xylene, mesitylene, 1,3,5-triisopropylbenzene, 1,2-dichloroethane, chlorobenzene, 1,2-dichlorobenzene, 1,2,4-trichlorobenzene; even more preferred are tetrahydrofuran, γ-butyrolactone, anisole, toluene, xylene, mesitylene, 1,3,5-triisopropylbenzene, 1,2-dichloroethane, chlorobenzene, 1,2-dichlorobenzene, 1,2,4-trichlorobenzene; still more preferred are γ-butyrolactone, anisole, mesitylene, 1,3,5-triisopropylbenzene, 1,2-dichlorobenzene, 1,2,4-trichlorobenzene. One or more of these solvents may be used herein either singly or as combined.

Preferably, the boiling point of the organic solvent for the reaction is 50° C. or higher, more preferably 100° C. or higher, even more preferably 150° C. or higher.

Preferably, the concentration of the reaction solution is from 1 to 50% by weight, more preferably from 5 to 30% by weight, even more preferably from 10 to 20% by weight.

Adding a related metal catalyst capable of promoting the polymerization of carbon-carbon triple bond to the system of polymerization of the compound of formula (I) is especially preferable from the viewpoint of shortening the reaction time and lowering the reaction temperature.

The metal catalyst may be a palladium, nickel, tungsten, molybdenum or the like metal catalyst. Its preferred examples are Pd catalysts such as $Pd(PPh_3)_4$, bis(benzonitrile)palladium chloride, $Pd(OAc)_2$; Ni catalysts such as Ziegler-Natta catalysts, nickel acetylacetonate; W catalysts such as $WCl_6$; Mo catalysts such as $MoCl_5$; Ta catalysts such as $TaCl_5$; Nb catalysts such as $NbCl_5$; and Rh catalysts and Pt catalysts. Especially preferred are Pd catalysts as inhibiting the polymer gellation and insolubilization to the minimum level and providing films of low dielectric constant.

Preferably, the amount of the metal catalyst to be added to the system is from 0.0001 to 0.1 mols, more preferably from 0.0005 to 0.05 mols, even more preferably from 0.001 to 0.01 mols per mol of the acetylene group of the compound from the viewpoint of increasing the weight-average molecular weight of the polymer to be obtained and increasing the solubility thereof in organic solvent.

The optimum polymerization condition for the compound of formula (I) varies, depending on the presence or absence of catalyst, the amount of catalyst, the type of solvent and the concentration. For example, the inner temperature is preferably from 0° C. to 230° C., more preferably from 100° C. to 230° C., even more preferably from 180° C. to 230° C.; and the reaction time is preferably from 1 to 50 hours, more preferably from 2 to 20 hours, even more preferably from 3 to 10 hours.

For preventing oxidative decomposition of the polymer, it is desirable that the polymerization is carried out in an inert gas atmosphere (e.g., nitrogen, argon).

The preferred range of the weight-average molecular weight of the polymer obtained is from 1000 to 500000, more preferably from 5000 to 300000, even more preferably from 10000 to 200000.

The polymer of the compound of formula (I) may be insolubilized in organic solvent by heating it, after applied to a support. This is because the ethynyl group remaining in the polymer undergoes further polymerization after the post-heating treatment. The condition for the post-heat treatment is as follows: The temperature is preferably from 100 to 450° C., more preferably from 200 to 420° C., even more preferably from 350° C. to 400° C.; and the time is preferably from 1 minute to 2 hours, more preferably from 10 minutes to 1.5 hours, even more preferably from 30 minutes to 1 hour. The post-heat treatment may be effected twice or more times. Preferably, the post-heat treatment is carried out in a nitrogen atmosphere so as to prevent thermal oxidation with oxygen.

Film-Forming Composition Containing Compound having Cage Structure

The film-forming composition may be prepared by dissolving the compound having a cage structure and optionally any other component in an organic solvent. Thus prepared, the composition may be a coating solution.

Though not particularly limited, examples of the suitable solvent which can be used in the invention include methanol, ethanol, isopropanol, 1-butanol, 2-ethoxymethanol, 3-methoxypropanol and the like alcohol solvents; acetone, acetylacetone, methyl ethyl ketone, methyl isobutyl ketone, 2-pentanone, 3-pentanone, 2-heptanone, 3-heptanone, cyclohexanone and the like ketone solvents; ethyl acetate, propyl acetate, butyl acetate, isobutyl acetate, pentyl acetate, ethyl propionate, propyl propionate, butyl propionate, isobutyl propionate, propylene glycol monomethyl ether acetate, methyl lactate, ethyl lactate, γ-butyrolactone and the like ester solvents; diisopropyl ether, dibutyl ether, ethyl propyl ether, anisole, phenetole, veratrol and the like ether solvents; mesitylene, ethylbenzene, diethylbenzene, propylbenzene, 1,2-dichlorobenzene and the like aromatic hydrocarbon solvents; N-methylpyrrolidinone, dimethylacetamide and the like amide solvents and the like, and these may be used alone or as a mixture of two or more.

More preferred solvents are acetone, propanol, cyclohexanone, propylene glycol monomethyl ether acetate, methyl lactate, ethyl lactate, γ-butyrolactone, anisole, mesitylene and 1,2-dichlorobenzene.

The total solid concentration of the film-forming composition in the form of a coating solution is preferably from 3 to 50% by weight, more preferably from 5 to 35% by weight, even more preferably from 7 to 20% by weight.

The amount of the compound having a cage structure in the film-forming composition may be generally from 10 to 95% by weight, but preferably from 30 to 90% by weight relative to the total solid content of the composition to form an insulating film.

Preferably, the ratio of all carbon atoms of the cage structure of the compound having a cage structure in the film-forming composition to all carbon atoms of the total solid content of the composition is 30% or more, more preferably from 30 to 100%, even more preferably from 50 to 95%, still more preferably from 60 to 90%, in order that the insulating film formed from the composition may have good properties (dielectric constant, mechanical strength). The total solid content of the film-forming composition corresponds to the total solid content of the insulating film to be formed from the composition. Those not remaining in the insulating film formed from the composition, such as a pore-forming agent, should not be within the solid content.

The present inventors have found that, when a pore-forming agent is in the film-forming composition along with the compound having a cage structure therein, then the composition may form a film having good mechanical strength and a low dielectric constant.

Pore-Forming Agent

The pore-forming agent to be in the film-forming composition of the invention is a substance that has the function of forming pores in the film formed from the composition. For example, when a film formed from the film-forming composition that contains such a pore-forming agent is heated, then the pore-forming agent form spores in the film. Accordingly, porous films can be formed from the composition containing such a pore-forming agent.

The pore-forming agent is not specifically limited, for which, for example, various polymers may be used.

Preferably, the polymer for the pore-forming agent thermodegrades at a temperature lower than the thermodegradation temperature of the matrix that constitutes the film formed from the composition, such as the polymer including a cage structure derived from the compound having a cage structure in the composition.

The polymer usable for the pore-forming agent includes, for example, polyvinyl aromatic compounds (e.g., polystyrene, polyvinylpyridine, halogenated-polyvinyl aromatic compounds), polyacrylonitrile, polyalkylene oxides (e.g., polyethylene oxide, polypropylene oxide), polyethylene, polylactic acid, polysiloxane, polycaprolactone, polycaprolactam, polyurethane, polymethacrylates (e.g., polymethyl methacrylate), polymethacrylic acid, polyacrylates (e.g., polymethyl acrylate), polyacrylic acid, polydienes (e.g., polybutadiene, polyisoprene), polyvinyl chloride, polyacetal, amine-capped alkylene oxides (Jeffamine™ polyetheramines commercially available from Huntsman Corp.).

In addition, also usable are polyphenylene oxide, poly (dimethylsiloxane), polytetrahydrofuran, polycyclohexylethylene, polyethyloxazoline, polyvinylpyridine. An oligomer of a compound to form a matrix in the film (e.g., compound having a cage structure mentioned above) may also function as the pore-forming agent.

The polymer serving as a pore-forming agent as above may be any of homopolymer, block copolymer, random copolymer or their mixture. It may have a linear, branched, ultra-branched, dendritic or starlike structure.

Polystyrene is especially preferred for the pore-forming agent. Polystyrene includes, for example, anionic-polymerized polystyrene, syndiotactic polystyrene, unsubstituted and substituted polystyrene (e.g., poly($\alpha$-methylstyrene)), and unsubstituted polystyrene is preferred.

For example, when a thermosetting mixture of polycyclopentadienone and polyacetylene is used as a matrix as in WO98/11149, then polystyrene in the mixture may degrade at a high temperature (for example, at about 420° C. to 450° C.) essentially into its monomer, and the resulting monomer diffuses out of the matrix. Therefore, polystyrene is preferred.

The pore-forming agent may be so designed that it reacts with a matrix-forming compound (matrix precursor such as compound having a cage structure) in a film to thereby form a block or a pendant substituent of the polymer chain. For example, a thermoplastic polymer having a reactive group such as vinyl, acrylate, methacrylate, allyl, vinyl ether, maleimido, styryl, acetylene, nitrile, furan, cyclopentadienone, perfluoroethylene, benzocyclobutene (BCB), pyrone, propiolate or ortho-diacetylene group may form a chemical bond to the matrix precursor. After that, the thermoplastic polymer is removed and pores (voids) may remain in the matrix.

Examples of the thermoplastic polymer of the type are polystyrene, polyacrylate, polymethacrylate, polybutadiene, polyisoprene, polyphenylene oxide, polypropylene oxide, polyethylene oxide, poly(dimethylsiloxane), polytetrahydrofuran, polyethylene, polycyclohexylethylene, polyethyloxazoline, polycaprolactone, polylactic acid, polyvinylpyridine.

The polymer designed so as to react with such a matrix precursor may be a homopolymer or a copolymer or their mixture.

One or more reactive groups may be on the thermoplastic polymer. The number and the type of the reactive groups may be suitably determined depending on how the thermoplastic polymer is bound to the matrix precursor as a pendant substance or a block thereof. The polymer may have a linear, branched, ultra-branched, dendritic or starlike structure.

The preferred molecular weight of the polymer serving as a pore-forming agent may be suitably determined, depending on various factors such as the compatibility of the polymer with a matrix precursor and with the matrix formed by polymerizing and curing the precursor, and the pore size in the insulating film. In general, however, the number-average molecular weight (Mn) of the pore-forming agent is preferably from 2,000 to 100,000, more preferably from 5,000 to 50,000, even more preferably from 5,000 to 35,000. Also preferably, the polymer has a narrow molecular weight distribution (Mw/Mn=1.01 to 1.5).

The pore-forming agent may also be a granular substance of which the size corresponds to the size of the pores to be formed in the insulating film. The substance preferably has a mean diameter of from 0.5 to 50 nm, more preferably from 0.5 to 20 nm. The substance is not specifically defined in point of its material. For example, it includes ultra-branched polymer and latex particles such as dendrimer particles. Especially preferred are crosslinked polystyrene-containing latex particles.

Examples of the substance are polyamidamine (PAMAM) dendrimer available from Dendritech Inc. and described by Tomalia et al. in Polymer J. (Tokyo), Vol. 17, 117 (1985); polypropyleneimine-polyamine (DAB-Am) dendrimer available from DSM Corporation; Frechet-type polyether dendrimer (described by Frechet et al. in J. Am. Chem. Soc., Vol. 112, 7638 (1990), Vol. 113, 4252 (1991)); Percec-type monodendrone, dendronated polymer and their self-aggregate polymer (described by Percec et al. in Nature, Vol. 391, 161 (1998), J. Am. Chem. Soc., Vol. 119, 1539 (1997)); Voltron H-series dendritic polyester (commercially available from Perstorp AB).

The pore-forming agent may be an organic solvent.

The organic solvent useful as the pore-forming agent in the invention is preferably one that evaporates at a temperature lower than the thermodegradation temperature of the matrix of the film.

When an organic solvent functions as the pore-forming agent, then it may form pores, for example, according to the mechanism mentioned below. The compound having a cage structure or its prepolymer or partially-crosslinked polymer that is the matrix precursor in the film-forming composition of the invention is first swollen with the liquefied or gasified solvent, then the thus-swollen precursor is crosslinked for increasing the structure maintenance thereof, and thereafter the liquid or gaseous solvent is removed in vacuum or under heat to thereby form the intended pores.

The solvent suitable for the pore-forming agent includes mesitylene, pyridine, triethylamine, N-methylpyrrolidinone (NMP), methyl benzoate, ethyl benzoate, butyl benzoate, cyclopentanone, cyclohexanone, cycloheptanone, cyclooctanone, cyclohexylpyrrolidinone; ethers and hydroxyethers such as dibenzyl ether, diglyme, triglyme, diethyleneglycol ethyl ether, diethylene glycol methyl ether, dipropyleneglycolmethyl ether, dipropylene glycol dimethyl ether, propylene glycol phenyl ether, propylene glycolmethyl ether, tripropylene glycolmethyl ether; and toluene, xylene, benzene, dipropylene glycol monomethyl ether acetate, dichlorobenzene, propylene carbonate, naphthalene, diphenyl ether, butyrolactone, dimethylacetamide, dimethylformamide. One or more of these may be used herein either singly or as combined.

In the system mentioned above, which comprises a matrix, or that is, a solid component derived from the compound having a cage structure, and a pore-forming agent, and in which the pore-forming agent is removed under heat as in the manner mentioned below, the compound having a cage structure and the pore-forming agent are preferably so selected and combined that the intended matrix is formed before the pore-forming agent is evaporated away or degraded under heat and that the pore-forming agent is preferably completely or substantially completely evaporated away or degraded before the matrix is evaporated or degraded. When the difference between the temperature at which the matrix is crosslinked and the temperature at which the pore-forming agent is evaporated away or degraded is large, then it is desirable since the latitude in selecting the pore-forming agent is broad.

The film-forming composition that contains the pore-forming agent as above may form an insulating film having a low dielectric constant and high mechanical strength and having fine pores therein, and the film is utilizable as an interlayer insulating film in semiconductor devices such as electronic devices.

The present inventors have found that, even though the pore-forming agent is not used in the invention, the film-forming composition (this may be referred to as "insulating film-forming coating solution") of the invention may also provide an insulating material having good mechanical strength and a low dielectric constant so far as the compound having a cage structure in the composition is so designed that its cage structure is formed of at least 11 or more carbon or more atoms and that the ratio of all carbon atoms of the cage structure to all carbon atoms of the total solid content of the composition is 30% or more.

The film-forming composition of the invention may contain any additives such as radical generator, nonionic surfactant, fluorine-containing ionic surfactant, silane-coupling agent added thereto, not deteriorating from the properties. (e.g., heat resistance, dielectric constant, mechanical strength, coatability, adhesiveness) of the insulating film to be formed from the composition.

The radical generator includes, for example, t-butyl peroxide, pentyl peroxide, hexyl peroxide, lauroyl peroxide, benzoyl peroxide, azobisisobutyronitrile. The nonionic surfactant includes, for example, octylpolyethylene oxide, decylpolyethylene oxide, dodecylpolyethylene oxide, octylpolypropylene oxide, decylpolypropylene oxide, dodecylpolypropyleneoxide. The fluorine-containing nonionic surfactant includes, for example, perfluorooctylpolyethylene oxide, perfluorodecylpolyethylene oxide, perfluorododecylpolyethylene oxide. The silane-coupling agent includes, for example, vinyltrimethoxysilane, vinyltriethoxysilane, vinyltriacetoxysilane, allyltrimethoxysilane, allyltriethoxysilane, divinyldiethoxysilane, trivinylethoxysilane, and their hydrolyzates and dehydrated condensates.

The suitable range of the amount of the additive that may be in the composition varies, depending on the use of the additive and the solid concentration of the film-forming composition. In general, the total amount of all additives in the composition may be preferably from 0.001% by weight to 10% by weight, more preferably from 0.01% by weight to 5% by weight, even more preferably from 0.05% by weight to 2% by weight relative to the total amount of the film-forming composition.

The present inventors have studied for the purpose of further improving the adhesiveness of the insulating material formed from the film-forming composition as above, and have found that, when an adhesion promoter is added to the composition, then the adhesiveness of the insulating material can be improved.

The insulating material having good adhesiveness of the invention contains a polymer formed from the film-forming composition that contains a compound having a cage structure (polymer including a cage structure), and an adhesion promoter. The insulating material may be formed by applying a composition containing a compound having a cage structure and an adhesion promoter (hereinafter this may be referred to as "insulating material-forming composition"), for example, onto a substrate, drying it and preferably further heating it. Thus formed, the film for the insulating material contains the polymer including a cage structure and the adhesion promoter. Alternatively, the film may also be formed by first applying an adhesion promoter onto a substrate, then further applying thereon a composition that contains a compound having a cage structure mentioned below, and drying it and preferably heating it. Thus formed, the film for the insulating material also contains the polymer including a cage structure and the adhesion promoter.

Typical examples of the adhesion promoter usable in the invention are silanes, preferably organosilanes such as alkoxysilanes (e.g., trimethoxyvinylsilane, triethoxyvinylsilane, tetraethoxysilane, phenyltrimethoxysilane, allyltrimethoxysilane, divinyldiethoxysilane), acetoxysilanes (e.g., vinyltriacetoxysilane, 3-aminopropyltrimethoxysilane), and their hydrolyzates and dehydrated condensates; hexamethyldisilazane [$(CH_3)_3$—Si—NH—Si$(CH_3)_3$], or aminosilane couplers such as γ-aminopropyltriethoxysilane; chelates (e.g., aluminium monoethylacetacetate diisopropylate [(iso-$C_3H_7O)_2Al(OCOC_2H_5CHCOCH_3)$)] and aluminium alkoxides as forming aluminium oxide). These materials may be mixed for use herein. Commercially-available adhesion promoters may also be used.

The amount of the adhesion promoter that may be in the film-forming composition may be generally from 0.005% by weight to 5% by weight, but preferably from 0.1 to 2% by weight relative to the total solid content of the composition.

The film-forming composition that contains such an adhesion promoter is described in detail hereinunder.

Preparation of Insulating Film Containing Polymer Including Cage Structure

A coating film is formed from the above-mentioned, film-forming composition, and then this is dried and optionally heated to be an insulating film that contains a polymer including a cage structure.

The insulating film that contains a polymer including a cage structure may be formed by applying the above-mentioned film-forming composition onto a substrate in any desired method of spin coating, roller coating, dipping or scanning, and then heating it to remove the solvent. The heating method is not specifically defined. Any ordinary method of using a hot plate or a heating furnace, as well as a method of photoirradiation with a xenon lamp for RTP (rapid thermal processor) is employable herein.

After coated, the substrate is heated whereby the coating composition is crosslinked to give an insulating film having good mechanical strength and heat resistance. The optimum condition for the heat treatment is as follows: The heating temperature is preferably from 200 to 450° C., more preferably from 300 to 420° C., even more preferably from 350° C. to 400° C.; and the heating time is preferably from 1 minute to 2 hours, more preferably from 10 minutes to 1.5 hours, even more preferably from 30 minutes to 1 hour. The heat treatment may be carried out in a few stages.

Though not specifically defined, the thickness of the insulating film that contains a polymer including a cage structure is preferably from 0.001 to 100 μm, more preferably from 0.01 to 10 μm, even more preferably from 0.1 to 1 μm.

The ratio of all carbon atoms of the cage structure to all carbon atoms constituting the insulating film is preferably 30% or more in order that the film may have better properties (dielectric constant, mechanical strength), more preferably from 50 to 95%, even more preferably from 60% to 90%.

The insulating film of the preferred type may be formed by controlling the ratio of all carbon atoms of the cage structure to all carbon atoms of the total solid content of the film-forming composition in preparing the composition as so mentioned hereinabove.

Even though a pore-forming agent is not added to the film-forming composition of the invention, the composition may form an insulating film having good mechanical strength and a low dielectric constant so far as the cage structure of the compound having a cage structure in the composition is so designed that its cage structure is formed of at least 11 or more carbon atoms and that the ratio of all carbon atoms of the cage structure to all carbon atoms of the total solid content of the composition is 30% or more.

Film-Forming Composition Containing Compound having Cage Structure and Pore-Forming Agent In the film-forming composition that contains a compound having a cage structure and a pore-forming agent, the compound having a cage structure is a matrix precursor of a film to be formed from the composition.

The film-forming composition of the invention may contain a solvent such as that mentioned above, along with the matrix precursor and the pore-forming agent therein, and it may be a composition suitable for coating solution.

The amount of the matrix precursor relative to the amount of the pore-forming agent is so controlled that the film formed from the composition could have a desired degree of porosity. In general, the proportion of the pore-forming agent is preferably from 2 to 70% by weight, more preferably from 5 to 60% by weight, most preferably from 10 to 50% by weight based on the total weight of the pore-forming agent and the matrix precursor.

Prior to the application of the coating solution onto a substrate, the pore-forming agent and the matrix precursor may be merely mixed, or may be partly reacted. The pore-forming agent may be added to the film-forming composition in any stage before the composition is used as a coating solution.

Formation of Insulating Film from Film-Forming Composition Containing Pore-Forming Agent An insulating film may be formed from the film-forming composition that contains a pore-forming agent of the invention, for example, by applying a coating solution of the composition onto a substrate in any desired method of spin coating, roller coating, dipping or scanning, and then heating it. The heating method is not specifically defined. Any ordinary method of using a hot plate or a heating furnace, as well as a method of photoirradiation with a xenon lamp for RTP (rapid thermal processor) is employable herein.

For example, the coating solution that contains a pore-forming agent is applied onto a substrate, then the solvent is removed (by drying) to form a coating film of a matrix precursor on the substrate, and the substrate is then baked under a condition satisfactory for further polymerizing (curing) the matrix precursor. The baking temperature may be suitably determined depending on the physical properties of the matrix precursor.

For example, when the pore-forming agent is a polymer or a granular substance such as that mentioned hereinabove, then it is desirable that, after the composition has been applied onto a substrate, the substrate is heated preferably at a moderate temperature (e.g., 40 to 250° C.) so as to remove the solvent (by drying). Next, it is desirable that the substrate is rapidly heated at a sufficient temperature whereby the matrix precursor is crosslinked. Next, it is also desirable that the substrate is further heated at a temperature satisfactory for evaporation or degradation of the pore-forming agent whereby the agent is removed.

The drying (for solvent removal), the curing and the evaporation or degradation of the pore-forming agent may be carried out in separate heating steps (in a mode of multistage heating), or may be carried out in one and the same heating step. In the former case of multistage heating, at least any one or more of the drying (for solvent removal), the curing and the evaporation or degradation of the pore-forming agent shall be attained in any of the multistage heating steps.

In one preferred embodiment, the substrate coated with the coating solution is heated at a temperature satisfactory for rapid curing but lower than the degradation temperature or the vaporization temperature of the pore-forming agent. One suitable method for the rapid heating comprises, for example, baking on a hot plate and rapid thermal annealing under an IR lamp. The composition (coating solution) is first heated up to a temperature preferably higher than 300° C., more preferably higher than 350° C., at a heating rate of at least 20° C./sec, more preferably at least at 50° C./sec in the initial curing step. The retention time at the final temperature in the initial curing step is preferably from 10 to 400 minutes. In the initial curing step, the matrix shall be cured enough for satisfactory fixation of the structure of the pore-forming agent and the matrix, or that is, it may not be completely cured. Next, at least one additional heating step is carried out for complete curing, or as the case may be, for evaporation or degradation of the pore-forming agent. The additional heating temperature is preferably higher than 370° C., more preferably higher than 390° C. The retention time in the additional heating step is preferably from 10 to 400 minutes.

In another preferred embodiment, the substrate may be processed in one rapid heating step in which the substrate is heated preferably at least at a heating rate of 20° C./min, more preferably at least at 50° C./sec up to a temperature satisfactory for both curing and evaporation or degradation of the pore-forming agent (e.g., 300 to 450° C., for a retention time of from 10 to 400 minutes). The single rapid heating step may be carried out after drying, or may also be carried out alone not combined with a separate drying step.

When a multilayered film is formed, the processing steps after the coating step may be repeated. After the porous film has been formed, the film may be etched or patterned in any known method for forming grooves, via-holes or through-holes that are desired in fabrication of integrated circuit devices and other ultra-small-sized electronic devices.

In the insulating film of the invention, it is desirable that at least 80%, more preferably at least 90%, even more preferably at least 95% of the pore-forming agent is removed. The degree of the removal of the pore-forming agent may be confirmed through IR spectrometry or transmission electronic microscopy. For example, in case where a polymer is used as the pore-forming agent, it may be removed from the film when the polymer is degraded into low-molecular substances capable diffusing out of the film. For example, when a thermoplastic pore-forming agent is used, it is desirable that at least 80%, more preferably at least 90%, even more preferably at least 0.95% of the agent is degraded into monomer units or further smaller units.

The pore-forming agent may be removed in any method including the heating method mentioned hereinabove as one preferred embodiment of the removal. The atmosphere for the heating method may be suitably determined depending on the properties of the components of the composition. For example, the heating may be carried out in the absence of oxygen or may be carried out in the presence of oxygen for promoting the removal of the pore-forming agent. Further, the heating may be carried out with forced addition of oxygen to the system. The method to be carried out in the presence of oxygen is especially desirable when the matrix is relatively stable against thermal oxidation.

For example, when a polystyrene-containing pore-forming agent is used, then the heating is preferably carried out in the absence of oxygen.

The pore-forming agent may be removed in a wet dissolution method in which the agent is dissolved in a solvent and is therefore effectively removed from the matrix, or may be removed in a dry or plasma removal method for selective removal of the pore-forming agent alone through plasma chemistry. For example, a substance shown below as "dispersion second phase" may be dissolved in a solvent such as that mentioned above or in an ultra-critical gas, and this may be used for removal of the pore-forming agent. The dispersion second phase may be any substance capable of dispersing on a nano-scale level and capable of diffusing in a matrix/pore-forming agent system and diffusing out of the system, and capable of dissolving in the above-mentioned solvent. For example, it includes thermoplastic substances, diblock polymers and inorganic substances.

The coating film of the matrix precursor or the matrix formed of it (generally having a thickness of from 0.1 to 5 μm) may be optionally smoothened through chemical mechanical polishing (CMP). The pore-forming agent may be removed in any stage before or after the CMP step.

Not specifically defined, the thickness of the insulating film of the invention is preferably from 0.001 to 100 μm, more preferably from 0.01 to 10 μm, even more preferably from 0.1 to 1 μm.

The pore density of the insulating film thus obtained in the manner as above is preferably enough for reduction in the specific dielectric constant of the insulating film to less than 2.5, more preferably to less than 2.2. Preferably, the pore concentration is from 5 to 60% by volume, more preferably from 10 to 50% by volume, even more preferably from 15 to 40% by volume based on the total volume of the insulating film.

Preferably, the mean diameter of the pores is 20 nm or less, more preferably 10 nm or less, even more preferably 5 nm or less, still more preferably 2 nm or less, most preferably 1 nm or less.

The mean diameter of the pores may be determined by the use of an X-ray scattering analyzer.

Insulating Material Containing Polymer Including Cage Structure and Adhesion Promoter The insulating material that contains a polymer including a cage structure and an adhesion promoter may be formed from the above-mentioned, insulating material-forming composition that contains a compound having a cage structure and an adhesion promoter, for example, by applying the composition onto a substrate in any desired method of spin coating, roller coating, dipping or scanning, and then heating it to remove the solvent. The heating method is not specifically defined. Any ordinary method of using a hot plate or a heating furnace, as well as a method of photoirradiation with a xenon lamp for RTP (rapid thermal processor) is employable herein.

It is desirable that, after coated, the substrate is heated whereby the compound having a cage structure is crosslinked to provide an insulating material having good mechanical strength and heat resistance. The optimum condition for the heat treatment is as follows: The heating temperature is preferably from 200 to 450° C., more preferably from 300 to 420° C., even more preferably from 350° C. to 400° C.; and the heating time is preferably from 1 minute to 2 hours, more preferably from 10 minutes to 1.5 hours, even more preferably from 30 minutes to 1 hour. The heat treatment may be carried out in a few stages.

Though not specifically defined, the thickness of the insulating material is preferably from 0.001 to 100 μm, more preferably from 0.01 to 10 μm, even more preferably from 0.1 to 1 μM.

The content of the adhesion promoter in the insulating material may be generally from 0.05% by weight to 5% by weight, but preferably from 0.1 to 2% by weight based on the total solid content of the material.

In that manner as above, an insulating material that contains a polymer including a cage structure and an adhesion promoter may be formed from the insulating material-forming composition that contains a compound having a cage structure and an adhesion promoter.

The insulating material that contains a polymer including a cage structure and an adhesion promoter of the invention may also be formed by applying an adhesion promoter onto a substrate, then applying thereon a composition that contains a compound having a cage structure, drying it and preferably further heating it. Thus formed, the film contains a polymer including a cage structure and an adhesion promoter.

The adhesion promoter may be applied onto a substrate as follows: The promoter is dissolved in a suitable solvent (e.g., cyclohexanone, propylene glycol propyl ether, propylene glycol methyl ether acetate) to prepare a coating solution having a concentration of from 0.01% by weight to 5% by weight, the resulting solution is applied onto a substrate, then the substrate is dried to remove any excess solution, and optionally this is heated. The amount of the adhesion promoter to be applied to the substrate may be generally from 1 A to 500 A, but preferably from 10 A to 200 A in terms of the film thickness thereof.

Next, like that for the above-mentioned insulating material-forming composition, a composition that contains a compound having a cage structure but not an adhesion promoter (this is the same as the above-mentioned insulating material-forming composition except that it does not contain an adhesion promoter) is applied onto a substrate, drying it and optionally further heating it. After all, the process gives an insulating material that contains a polymer including a cage structure and an adhesion promoter.

The adhesion promoter may be applied onto a substrate as follows: For example, when a chelate of aluminium monoethylacetacetate diisopropylate is used as the adhesion promoter, a toluene solution of the chelate is spread on a substrate, and then this is baked in oxygen at 350° C. for 30 minutes whereby an extremely thin (e.g., 5 nm) aluminium oxide film of an adhesion promoter layer is formed on the surface of the substrate.

Preferably, the ratio of all carbon atoms of the cage structure to all carbon atoms constituting the insulating material is 30% or mroe, more preferably from 50 to 95%, even more preferably from 60 to 90%, in order that the insulating material may have good properties (dielectric constant, mechanical strength). The formation of the insulating material of the type may be attained by controlling the ratio of all carbon atoms of the cage structure to all carbon atoms of the solid content of the composition for the material in preparing the insulating material-forming composition or in preparing the composition not containing an adhesion promoter but containing a compound having a cage structure, like that for the above-mentioned insulating material-forming composition. In this case, those not remaining in the insulating film formed from the composition, such as a pore-forming agent, should not be within the solid content.

Hybrid Insulating Film

The insulating film that contains a polymer including a cage structure as above is applicable to a hybrid insulating film.

The hybrid insulating film which the invention provides comprises a lower insulating film and an upper insulating film, in which any one of these films is an insulating film that contains a polymer including a cage structure and it is formed from a film-forming composition that contains a compound having a cage structure. In this, the insulating film is formed by applying a film-forming composition, which is prepared by dissolving the above-mentioned compound having a cage structure and any other optional component in an organic solvent, onto a substrate to form a coating film thereon, then drying and optionally further heating it.

The other insulating film of the hybrid insulating film that has the polymer including a cage structure-containing insulating film as above is not specifically defined so far as it differs from the polymer including a cage structure-containing insulating film in point of the element constitution. Difference in point of element constitution means that the two films differ from each other in point of the type and the ratio of the constitutive elements.

Preferably, the other insulating film contains a silicon atom. If desired, it may contain an oxygen atom, a hydrogen atom and a carbon atom.

One example of the insulating film of the type is an insulating film produced by applying a hydrolyzed condensate of a compound of the following formula (II) or its mixture, onto a substrate followed by baking it.

$$R_nSiX_{(4-n)} \quad (II)$$

wherein R represents a hydrogen or a substituent; X represents a hydrolyzable group; and n represents an integer of from 0 to 3.

Another example is an SiOC-type insulating film formed through CVD. Preferably, these films are porous for reducing the dielectric constant of the hybrid insulating film Concretely, herein mentioned are silica films as in JP-A 2003-253206 and 2004-59736.

Preferably, the thickness of the insulating film is from 0.05 to 2 μm, more preferably from 0.1 to 1 μm.

The other insulating film may be formed from a coating solution that contains components corresponding to the desired insulating film, in the same manner as that mentioned hereinabove for the formation of the insulating film that contains a polymer including a cage structure.

For example, it may be formed in a mode of spin coating or CVD. The spin coating method is illustrated, for example, in JP-A 2003-235206 and 2004-59736. For the CVD method, employable is any commercially-available CVD apparatus.

In the invention, the hybrid insulating film has a two-layered structure of upper and lower layers of the above-mentioned insulating film that contains a polymer including a cage structure and the other insulating film. In this, any of these two insulating films may be the lower insulating film and any other may be the upper insulating film. For forming the two-layered structure of upper and lower layers, for example, the methods of forming the respective layers may be carried out in order.

The insulating film of the invention is suitable for insulation-coating film in electronic parts such as semiconductor devices, multi-chip module multi-layered wiring boards, etc. Specifically, it is usable as interlayer insulating film for semiconductors, surface protective film, buffer coat film, as well as for passivation film in LSI, α-ray blocking film, cover lay film in flexographic plates, overcoat film, cover coat for flexible copper-lined plates, solder-resist film, and liquid-crystal alignment film, etc.

As other applications thereof, the film of the invention may be doped with an electron donor or acceptor so as to make the film electroconductive, and the resulting film may be used as a conductive film.

EXAMPLES

The following Examples are to describe the invention but not to restrict the scope of the invention.

Example A

Film-Forming Composition Containing Compound having a Cage Structure and Pore-Forming Agent Production Example 1

According to the method described in *Macromolecules*, 24, 5266 (1991), 4,9-dibromodiamantane was synthesized. Next, 1.30 g of commercially-available p-divinylbenzene, 3.46 g of 4,9-dibromodiamantane, 200 ml of dichloroethane and 2.66 g of aluminium chloride were fed into a 500-ml flask, and stirred at an internal temperature of 70° C. for 24 hours. Next, 200 ml of water was added to it, and the organic layer was separated through liquid-liquid separation. Anhydrous sodium sulfate was added to it, and the solid content was removed through filtration. Then, this was concentrated under reduced pressure until dichloromethane was reduced to a half. 300 ml of methanol was added to the resulting solution, and the deposited solid was taken out through filtration. 2.8 g of a polymer (A-4) having a weight-average molecular weight of about 10000 was thus obtained.

In the same manner, a polymer (A-12) having a weight-average molecular weight of about 10000 was synthesized through Friedel-Crafts reaction.

The structures of the polymers (A-4) and (A-12) are shown below, in which n represents a positive number.

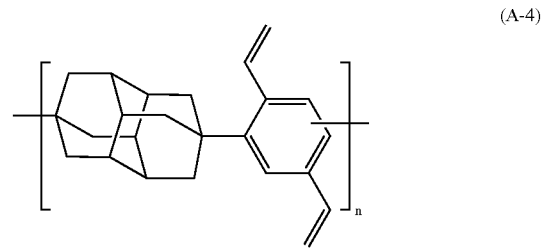

(A-4)

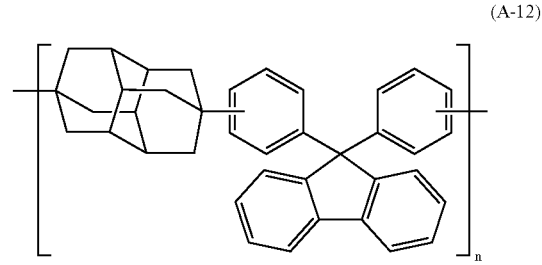

(A-12)

Production Example 2

Starting from diamantane and according to the method described in *Macromolecules*, 24, 5266-5268 (1991), 4,9-diethynyldiamantane was synthesized. Next, 10 g of 4,9-diethynyldiamantane and 2 g of polystyrene ester of 3,5-bis(phenylethynyl benzoate)(number-average molecular weight (Mn): 36,500) were stirred in a nitrogen stream atmosphere at an inner temperature of 190° C. for 12 hours. The reaction liquid was restored to room temperature, and 300 ml of isopropyl alcohol was added to it. The deposited solid was taken out through filtration and washed with methanol. 3.0 g of a polymer (A) having a weight-average molecular weight of 20000 was obtained.

Example 1

1.0 g of the above polymer (A-4) and 0.2 g of anion-polymerized polystyrene (Mn: 8200) were dissolved under heat in a mixed solvent of 5.0 ml of cyclohexanone and 5.0 ml of anisole to prepare a coating solution. The solution was filtered through a 0.1-micron tetrafluoroethylene filter, and then applied onto a silicon wafer in a mode of spin coating. The coating film was heated on a hot plate in a nitrogen stream atmosphere at 150° C. for 60 seconds, then further on a hot plate at 380° C. for 30 minutes, and still further at 425° C. for 60 minutes. The specific dielectric constant of the thus-formed insulating film having a thickness of 0.5 microns was calculated from the capacitance value thereof measured at 1 MHz by the use of Four Dimensions' mercury probe and Yokogawa Hewlett Packard's HP4285ALCR meter, and it was 2.12. Using MTS' nano-indenter SA2, the Young's modulus of the film was measured, and it was 2.2 GPa (measured at 25° C., hereafter as well). In visual inspection of the TEM image of the film, the mean pore diameter of the film was 4 nm.

Example 2

1.0 g of the above polymer (A-12) and 150 mg of 8-arm polyethylene glycol were dissolved under heat in a mixed solvent of 5.0 ml of gamma-butyrolactone and 5.0 ml of anisole to prepare a coating solution. The solution was filtered through a 0.1-micron tetrafluoroethylene filter, and then applied onto a silicon wafer in a mode of spin coating. The coating film was heated on a hot plate in a nitrogen stream atmosphere at 180° C. for 60 seconds, then further on a hot plate at 380° C. for 30 minutes, and still further at 425° C. for 60 minutes. The specific dielectric constant of the thus-formed insulating film having a thickness of 0.5 microns was 2.17. The Young's modulus of the film was 3.0 GPa. The mean pore diameter of the film was 3 nm.

Example 3

1.0 g of the polymer (A) produced in Production Example 2 was dissolved in 10.0 ml of cyclohexanone to prepare a coating solution. The solution was filtered through a 0.2-micron tetrafluoroethylene filter, and then applied onto a silicon wafer in a mode of spin coating. The coating film was heated on a hot plate in a nitrogen stream atmosphere at 110° C. for 90 seconds and then at 250° C. for 60 seconds, and further heated in an oven purged with nitrogen at 420° C. for 60 minutes. The specific dielectric constant of the thus-formed insulating film having a thickness of 0.50 microns was 2.13. The Young's modulus of the film was 3.10 GPa. The mean pore diameter of the film was 1 nm.

Comparative Example 1

According to the Example described in JP-T 2002-530505, the following experiment was carried out.

Anion-polymerized polystyrene having a number-average molecular weight of 8200 was added to an oligomer solution from 4,4'-bis(2,4,5-triphenylcyclopentadien-3-one)diphenyl ether and 1,3,5-tris(phenylethynyl)benzene in a molar ratio of 3/2, in an amount of 20% by weight relative to the solid content of the solution. The resulting solution was filtered through a 0.1-micron tetrafluoroethylene filter, and then applied onto a silicon wafer in a mode of spin coating. The coating film was heated on a hot plate in a nitrogen stream atmosphere at 150° C. for 60 seconds, then on a hot plate at 380° C. for 30 minutes, and further heated at 425° C. for 60 minutes. The specific dielectric constant of the thus-formed insulating film having a thickness of 0.5 microns was calculated from the capacitance value thereof measured at 1 MHz by the use of Four Dimensions' mercury probe and Yokogawa Hewlett Packard's HP4285ALCR meter, and it was 2.40. Using MTS' nano-indenter SA2, the Young's modulus of the film was measured, and it was 1.8 GPa. In visual inspection of the TEM image of the film, the mean pore diameter of the film was 100 nm.

As compared with the specific dielectric constant of 2.40 and the Young's modulus of 1.8 GPa in Comparative Example 1, the specific dielectric constant in Examples 1 to 3 was from 2.12 to 2.17 and the Young's modulus therein was from 2.2 to 3.10 GPa. From these, it is understood that the samples of Examples 1 to 3 have a lower dielectric constant and a higher mechanical strength than the sample of Comparative Example 1.

Example B

Film-Forming Composition Containing a Compound having a Cage Structure in such a Controlled Manner that the Cage Structure is Composed of at Least 11 or More Carbon Atoms and that the Ratio of all Carbon Atoms of the Cage Structure to all Carbon Atoms of the Total Solid Content of the Composition is 30% or more

Example 4

1.0 g of the polymer (A-4) produced in Production Example 1 was dissolved under heat in a mixed solvent of 5.0 ml of cyclohexanone and 5.0 ml of anisole to prepare a coating solution. The ratio of all carbon atoms of the cage structure (diamantane) to all carbon atoms of the total solid content of the insulating film-forming coating solution was about 58%. The solution was filtered through a 0.1-micron tetrafluoroethylene filter, and then applied onto a silicon wafer in a mode of spin coating. The coating film was heated on a hot plate in a nitrogen stream atmosphere at 150° C. for 60 seconds, and then further on a hot plate at 400° C. for 30 minutes. The specific dielectric constant of the thus-formed insulating film having a thickness of 0.5 microns was calculated from the capacitance value thereof measured at 1 MHz by the use of Four Dimensions' mercury probe and Yokogawa Hewlett Packard's HP4285ALCR meter, and it was 2.52. Using MTS' nano-indenter SA2, the Young's modulus of the film was measured, and it was 7.2 GPa. Using an optical film thickness analyzer, the thickness of the coating film was measured at 50 points, and the data were averaged. 3σ (dispersion) of the thus-determined film thickness was calculated, and it was 3.0%.

Example 5

1.0 g of the polymer (A-12) produced in Production Example 1 was dissolved under heat in a mixed solvent of 5.0 ml of gamma-butyrolactone and 5.0 ml of anisole to prepare a coating solution. The ratio of all carbon atoms of the cage structure (diamantane) to all carbon atoms of the total solid content of the insulating film-forming coating solution was about 36%. The solution was filtered through a 0.1-micron tetrafluoroethylene filter, and then applied onto a silicon wafer in a mode of spin coating. The coating film was heated on a hot plate in a nitrogen stream atmosphere at 180° C. for 60 seconds, and then further on a hot plate at 300° C. for 10 minutes. The specific dielectric constant of the thus-formed insulating film having a thickness of 0.5 microns was 2.57. The Young's modulus of the film was 6.0 GPa. 3σ of the film thickness was calculated, and it was 2.8%.

Comparative Example 2

A compound (R-1) described in JP-T 2.004-504455 was produced according to the method described in this specification.

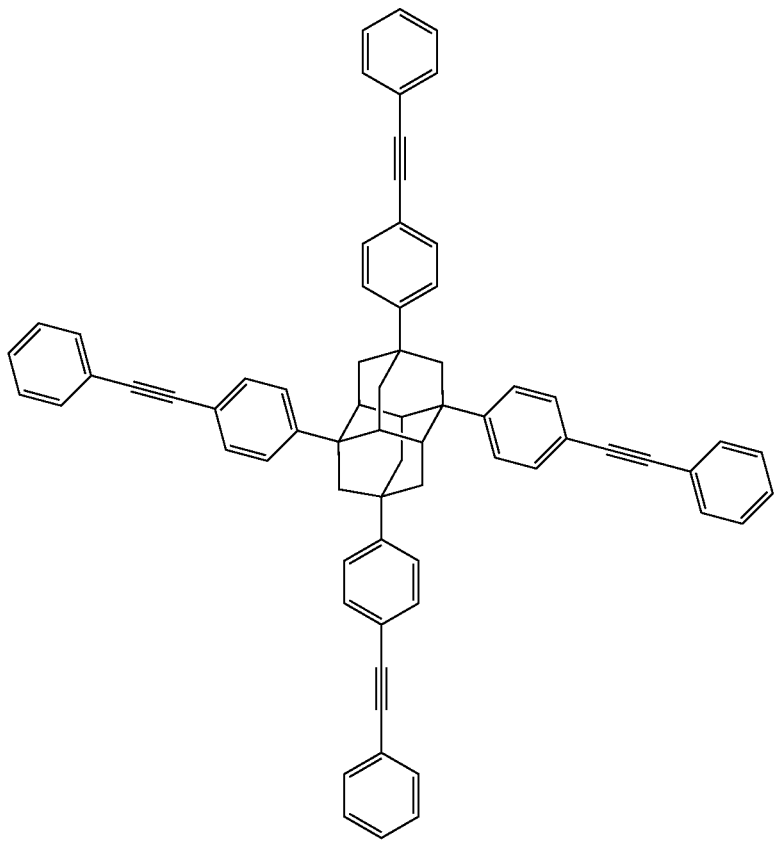

Comparative Polymer (R-1)

1.0 g of the compound (R-1) was dissolved under heat in 10.0 ml of gamma-butyrolactone to prepare a coating solution. The ratio of all carbon atoms of the cage structure (diamantane) to all carbon atoms of the total solid content of the insulating film-forming coating solution was about 20%. The solution was filtered through a 0.1-micron tetrafluoroethylene filter, and then applied onto a silicon wafer in a mode of spin coating. The coating film was heated on a hot plate in a nitrogen stream atmosphere at 180° C. for 60 seconds, and then further heated in an oven purged with nitrogen at 400° C. for 60 minutes. The specific dielectric constant of the thus-formed insulating film having a thickness of 0.5 microns was 2.65. The Young's modulus of the film was 3.0 GPa. 3σ of the film thickness was calculated, and it was 5.2%.

Production Example 3

Starting from diamantane and according to the method described in *Macromolecules*, 24, 5266-5268 (1991), 4,9-diethynyldiamantane was synthesized. Next, 10 g of 4,9-diethynyldiamantane and 50 ml of 1,2,4-trichlorobenzene were stirred in a nitrogen stream atmosphere at an inner temperature of 210° C. for 30 hours. The reaction liquid was restored to room temperature, and 300 ml of methanol was added to it. The deposited solid was taken out through filtration and washed with methanol. 6.0 g of a polymer (B) having a weight-average molecular weight of 170000 was obtained.

Example 6

1.0 g of the polymer (B) produced in Production Example 3 was dissolved under heat in 13.0 ml of 1,2-dichlorobenzene to prepare a coating solution. The ratio of all carbon atoms of the cage structure (diamantane) to all carbon atoms of the total solid content of the insulating film-forming coating solution was about 77%. The solution was filtered through a 0.1-micron tetrafluoroethylene filter, and then applied onto a silicon wafer in a mode of spin coating. The coating film was heated on a hot plate in a nitrogen stream atmosphere at 250° C. for 60 seconds, and then further heated in an oven purged with nitrogen at 400° C. for 60 minutes. The specific dielectric constant of the thus-formed insulating film having a thickness of 0.5 microns was 2.45. The Young's modulus of the film was 8.0 GPa. 3σ of the film thickness was calculated, and it was 2.5%. When the insulating film was observed with an optical microscope, no depositions were found therein.

Comparative Example 3

Starting from adamantane and according to the method described in *Macromolecules*, 24, 5262-5268 (1991), 1,3-diethynyladamantane was synthesized. Next, 10 g of 1,3-diethynyladamantane and 50 ml of 1,2,4-trichlorobenzene were stirred in a nitrogen stream atmosphere at an inner temperature of 210° C. for 30 hours. The reaction liquid was cooled to room temperature, and 300 ml of methanol was added to it. The deposited solid was taken out through filtration and washed with methanol. 6 g of a polymer (C) having a weight-average molecular weight of 150000 was obtained.

Next, 1.0 g of the polymer (C) was dissolved under heat in 15 ml of 1,2-dichlorobenzene. Since the polymer solubility in the solvent was low, some insoluble remained in the resulting liquid. The liquid was filtered through a 0.5-micron filter, and the resulting filtrate was further filtered through a 0.1-micron filter to prepare a coating solution. The solution was applied onto a silicon wafer in a mode of spin coating. The coating film was heated on a hot plate in a nitrogen stream atmosphere at 250° C. for 60 seconds, and then further heated in an oven purged with nitrogen at 400° C. for 60 minutes. The specific dielectric constant of the thus-formed insulating film having a thickness of 0.5 microns was 2.60. The Young's modulus of the film was 3.0 GPa. 3σ of the film thickness was calculated, and it was 6.5%. When the insulating film was observed with an optical microscope, numberless depositions were found therein.

Production Example 4

20 g of 4,9-diethynyldiamantane, 244 mg of $Pd(PPh_3)_4$, and 100 ml of 1,3,5-triisopropylbenzene were put into a 3-neck flask, and heated with stirring in a nitrogen stream atmosphere at an inner temperature of 200° C. for 10 hours. After cooled to room temperature, the reaction liquid was filtered to remove the insoluble from it. Isopropyl alcohol was added to the resulting filtrate, and the deposited solid was taken out through filtration. The thus-obtained solid was suspended in isopropyl alcohol, stirred, and again filtered. 6 g of a pale yellow polymer (D) was obtained. As a result of GPC analysis thereof, the weight-average molecular weight of the polymer was about 20,000.

Example 7

1.0 g of the polymer (D) was dissolved in 7.3 g of cyclohexanone with stirring at 25° C. for 60 minutes. Complete dissolution of the polymer was confirmed through visual observation. The ratio of all carbon atoms of the cage structure (diamantane) to all carbon atoms of the total solid content of the insulating film-forming coating solution was 78%.

The cyclohexanone solution was filtered through a 0.2-micron tetrafluoroethylene (TFE) filter, and then applied onto a silicon wafer in a mode of spin coating. The coating film was baked in a furnace purged with nitrogen at 400° C. for 60 minutes. A uniform film having a thickness of 0.5 microns was obtained. This film was dipped in cyclohexanone at room temperature for 5 hours, whereupon the film thickness did not reduce at all. FT-IR analysis of the film revealed the absence of peaks at 2100 $cm^{-1}$ and 3300 $cm^{-1}$ assigned to the acetylene group.

The specific dielectric constant of the thus-formed film was calculated from the capacitance value thereof measured at 1 MHz by the use of Four Dimensions' mercury probe and Yokogawa Hewlett Packard's HP4285ALCR meter, and it was 2.43. Using MTS' nano-indenter SA2, the Young's modulus of the film was measured, and it was 7.0 GPa.

Example 8

A film was formed in the same manner as in Example 7, for which, however, anisole was used in place of cyclohexanone, and its properties were evaluated. Like that in Example 7, the film formed herein also had good properties.

Production Example 5

2.0 g of 1,6-diethynyldiamantane, 8 mg of $Pd(PPh_3)_4$, and 10 ml of 1,3,5-triisopropylbenzene were put into a 3-neck flask, and heated with stirring in a nitrogen stream atmosphere at an inner temperature of 200° C. for 35 hours. After cooled to room temperature, the reaction liquid was filtered to remove the insoluble from it. Isopropyl alcohol was added to the resulting filtrate, and the deposited solid was taken out through filtration. The thus-obtained solid was suspended in isopropyl alcohol, stirred, and again filtered. 0.73 g of a pale yellow polymer (E) was obtained. As a result of GPC analysis thereof, the weight-average molecular weight of the polymer was about 17,000.

Example 9

0.5 g of the polymer (E) was dissolved in 3.7 g of o-dichlorobenzene with stirring at 25° C. for 60 minutes. Complete dissolution of the polymer was confirmed through visual observation. The ratio of all carbon atoms of the cage structure (diamantane) to all carbon atoms of the total solid content of the insulating film-forming coating solution was 78%.

The cyclohexanone solution was filtered through a 0.2-micron TFE filter, and then applied onto a silicon wafer in a mode of spin coating. The coating film was baked in a furnace purged with nitrogen at 400° C. for 60 minutes. A uniform film having a thickness of 0.5 microns was obtained. This film was dipped in o-dichlorobenzene at room temperature for 5 hours, whereupon the film thickness did not reduce at all.

The specific dielectric constant of the thus-formed film was calculated from the capacitance value thereof measured at 1 MHz by the use of Four Dimensions' mercury probe and Yokogawa Hewlett Packard's HP4285ALCR meter, and it was 2.37. Using MTS' nano-indenter SA2, the Young's modulus of the film was measured, and it was 6.5 GPa.

As compared with the specific dielectric constant of 2.65 and the Young's modulus of 3.0 GPa in Comparative Example 2 and with the specific dielectric constant of 2.60 and the Young's modulus of 3.0 GPa in Comparative Example 3, the specific dielectric constant in Examples 4 to 9 was from 2.37 to 2.57 and the Young's modulus therein was from 6.0 to 8.0 GPa. From these, it is understood that the samples of Examples 4 to 9 have a lower dielectric constant and a higher mechanical strength than those of Comparative Examples 2 and 3.

It is understood that the insulating films of the invention are better than those of Comparative Examples in point of the dielectric constant, the Young's modulus and the in-plane film thickness uniformity. It is further understood that the insulating films of the invention do not have depositions that may be caused by polymer aggregation therein. These are extremely excellent advantages that could not be foreseen from any known knowledge.

Example C

Insulating Material-Forming Composition Containing Compound having a Cage Structure and Adhesion Promoter

Production Example 6

3.92 g of vinyltriacetoxysilane and 1.13 g of phenyltrimethoxysilane were added to 95.15 g of propylene glycol monomethyl ether acetate to prepare an organosilane solution. To the solution, added was an equimolar weight of water based on the total silane content of the solution, and the resulting solution was shaken overnight. Next, the solution was filtered through a 0.1-μm filter to obtain an adhesion promoter solution.

Production Example 7

Starting from diamantane and according to the method described in *Macromolecules,* 24, 52626-5268 (1991), 4,9-diethynyldiamantane was synthesized. Next, 10 g of 4,9-diethynyldiamantane, 50 ml of 1,3,5-triisopropylbenzene and 120 mg of $Pd(PPh_3)_4$ were stirred in a nitrogen stream atmosphere at an inner temperature of 190° C. for 12 hours. The reaction liquid was restored to room temperature, and 300 ml of isopropyl alcohol was added to it. The deposited solid was taken out through filtration and washed with methanol. 3.0 g of a polymer (F) having a weight-average molecular weight of 20000 was obtained.

Example 10

The adhesion promoter solution obtained in Production Example 6 was applied onto a silicon wafer in a mode of spin coating, and the thus-coated wafer was baked on a hot plate at 180° C. for 60 seconds. The thickness of the film thus formed was 132 A.
On the other hand, 1.0 g of the polymer (A-4) produced in Production Example 1 was dissolved under heat in a mixed solvent of 5.0 ml of cyclohexanone and 5.0 ml of anisole to prepare a coating solution. The solution was filtered through a 0.1-micron tetrafluoroethylene filter, and then applied onto the silicon wafer that had been processed with the adhesion promoter, in a mode of spin coating. The coating film was heated on a hot plate in a nitrogen stream atmosphere at 150° C. for 60 seconds, and then further on a hot plate at 400° C. for 30 minutes. The specific dielectric constant of the thus-formed insulating film having a thickness of 0.5 microns was calculated from the capacitance value thereof measured at 1 MHz by the use of Four Dimensions' mercury probe and Yokogawa Hewlett Packard's HP4285ALCR meter, and it was 2.54. Using MTS' nano-indenter SA2, the Young's modulus of the film was measured, and it was 6.8 GPa. The adhesion strength of the film was measured with CMS Instruments' nano-scratch tester, and it was 8.1 mN.

Example 11

An adhesion promoter, Dow Chemical's AP4000 was applied on to a silicon wafer in a mode of spin coating, and the thus-coated wafer was baked on a hot plate at 180° C. for 60 seconds. The thickness of the coating film was 132 A. On the other hand, 1.0 g of the polymer (F) produced in Production Example 7 was dissolved under heat in 10 ml of cyclohexanone to prepare a coating solution. The solution was filtered through a 0.1-micron tetrafluoroethylene filter, and then applied onto the wafer that had been processed with the adhesion promoter, in a mode of spin coating. The coating film was heated on a hot plate in a nitrogen stream atmosphere at 180° C. for 60 seconds, and then further on a hot plate at 300° C. for 10 minutes. The specific dielectric constant of the thus-formed insulating film having a thickness of 0.45 microns was 2.47. The Young's modulus of the film was 6.0 GPa. The adhesion strength of the film was 8.3 mN.

Example 12

1.0 g of the polymer (F) produced in Production Example 7 was dissolved in 10.0 ml of cyclohexanone to prepare a coating solution. 1.0 ml of the adhesion promoter solution obtained in Production Example 4 was added to it. The resulting solution was filtered through a 0.2-micron tetrafluoroethylene filter, and then applied onto a silicon wafer in a mode of spin coating. The coating film was heated on a hot plate in a nitrogen stream atmosphere at 110° C. for 90 seconds, then further heated at 250° C. for 60 seconds, and still further heated in an oven purged with nitrogen at 400° C. for 60 minutes. The specific dielectric constant of the thus-formed insulating film having a thickness of 0.50 microns was 2.49. The Young's modulus of the film was 6.6 GPa. The adhesion strength of the film was 9.1 mN.

Comparative Example 4

1.0 g of the polymer (F) produced in Production Example 7 was dissolved in 10.0 ml of cyclohexanone to prepare a coating solution. The solution was filtered through a 0.2-micron tetrafluoroethylene filter, and then applied on to a silicon wafer in a mode of spin coating. The coating film was heated on a hot plate in a nitrogen stream atmosphere at 110° C. for 90 seconds, then further heated at 250° C. for 60 seconds, and still further heated in an oven purged with nitrogen at 400° C. for 60 minutes. The specific dielectric constant of the thus-formed insulating film having a thickness of 0.47 microns was 2.50. The Young's modulus of the film was 6.4 GPa. The adhesion strength of the film was 4.1 mN.

It is understood that the samples of Examples 10 to 12 are better than the sample of Comparative Example 4 in point of the adhesion strength.

Example D

Hybrid Insulating Film

Example 13

1.0 g of the polymer. (A-4) produced in Production Example 1 was dissolved under heat in a mixed solvent of 5.0 ml of cyclohexanone and 5.0 ml of anisole to prepare a coating solution (film-forming composition). The solution was filtered through a 0.1-micron tetrafluoroethylene filter, and then applied onto a silicon wafer in a mode of spin coating. The coating film was heated on a hot plate in a nitrogen stream atmosphere at 150° C. for 60 seconds and then further on a hot plate at 400° C. for 30 minutes to form a lower insulating film. The film thickness was 260 nm. The specific dielectric constant of the insulating film was calculated from the capacitance value thereof measured at 1 MHz by the use of Four Dimensions' mercury probe and Yokogawa Hewlett Packard's HP4285ALCR meter, and it was 2.50. An upper insulating film was formed on it, according to the method of Example 1 in JP-A 2003-253206.

Example 14

1.0 g of the polymer (F) of Production Example 7 was dissolved under heat in 10.0 ml of cyclohexanone to prepare a coating solution. The solution was filtered through a 0.1-micron tetrafluoroethylene filter, and then applied onto a silicon wafer in a mode of spin coating. The coating film was heated on a hot plate in a nitrogen stream atmosphere at 150° C. for 60 seconds and then further on a hot plate at 400° C. for 30 minutes to form a lower insulating film. The film thickness was 240 nm. The specific dielectric constant of the insulating film was 2.42. An upper insulating film was formed on it, according to the method of Example 1 in JP-A 2003-253206.

Example 15

A lower insulating film was formed on a silicon wafer according to the method of Example 1 in JP-A 2003-253206. Its thickness was 260 nm, and its specific dielectric constant was 2.21. 1.0 g of the polymer (F) of Production Example 7 was dissolved under heat in 10.0 ml of cyclohexanone to prepare a coating solution. The solution was filtered through a 0.1-micron tetrafluoroethylene filter, and then applied onto the lower insulating film in a mode of spin coating. The coating film was heated on a hot plate in a nitrogen stream atmosphere at 150° C. for 60 seconds and further on a hot plate at 400° C. for 30 minutes to form an upper insulating film. The dielectric constant of the upper insulating film that functions as a wiring interlayer insulating film is estimated to be 2.42 from Example 2.

Example 16

Using a CVD apparatus by Applied Material (AMAT), a lower insulating film of AMAT's insulating film Black Diamond was formed on a silicon wafer. Its thickness was 160 nm, and its specific dielectric constant was 2.99. 1.0 g of the polymer (F) of Production Example 7 was dissolved under heat in 10.0 ml of cyclohexanone to prepare a coating solution. The solution was filtered through a 0.1-micron tetrafluoroethylene filter, and then applied onto the lower insulating film in a mode of spin coating. The coating film was heated on a hot plate in a nitrogen stream atmosphere at 150° C. for 60 seconds and further on a hot plate at 400° C. for 30 minutes to form an upper insulating film. The dielectric constant of the upper insulating film that functions as a wiring interlayer insulating film is estimated to be 2.42 from Example 2.

Comparative Example 5

A hybrid insulating film was formed in the same manner as in Example 15, for which, however, the upper insulating film was formed of Dow Chemical's SiLK. The dielectric constant of the upper insulating film that functions as a wiring interlayer insulating film is estimated to be the same, 2.63, as the specific dielectric constant of a film of SiLK alone.

From the above, it is understood that, since the hybrid insulating film of the invention has a lower dielectric constant as a wiring interlayer insulating film than the hybrid insulating film of Comparative Example 5, it has better properties as an insulating film for semiconductor devices.

According to the invention, there are provided a composition suitable for an insulating film in electronic devices and capable of providing an insulating material having good properties in point of the dielectric constant, the mechanical strength and the adhesiveness thereof, an insulating film formed from the composition, and an electronic device having the insulating film.

The entire disclosure of each and every foreign patent application from which the benefit of foreign priority has been claimed in the present application is incorporated herein by reference, as if fully set forth.

What is claimed is:

1. A film-forming composition comprising:
   a compound having a cage structure; and
   an organic solvent,
   wherein a ratio of all carbon atoms of the cage structure to all carbon atoms of a total solid content of the film-forming composition is 50-95% and wherein the compound having a cage structure is a polymer of at least one compound represented by formula (I):

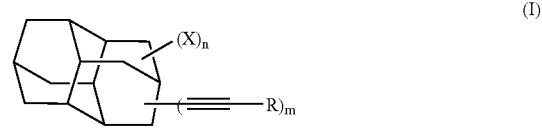

wherein R represents a hydrogen atom, an alkyl group having from 1 to 10 carbon atoms, an alkenyl group having from 2 to 10 carbon atoms, an alkynyl group having from 2 to 10 carbon atoms, an aryl group having from 6 to 20 carbon atoms or a silyl group having from 0 to 20 carbon atoms;

m represents an integer of from 1 to 14;

X represents a halogen atom, an alkyl group having from 1 to 10 carbon atoms, an alkenyl group having from 2 to 10 carbon atoms, an aryl group having from 6 to 20 carbon atoms or a silyl group having from 0 to 20 carbon atoms; and n represents an integer of from 0 to 13.

2. The film-forming composition according to claim 1, wherein, in formula (I), R is a hydrogen atom or an alkyl group having from 1 to 10 carbon atoms, m=1 to 3 and n=0.

3. The film-forming composition according to claim 1, wherein the compound having a cage structure does not have a nitrogen atom.

4. An insulating film formed from a film-forming composition according to claim 1.

5. An electronic device comprising an insulating film formed from a film-forming composition according to claim 1.

* * * * *